(12) United States Patent
Shinoda et al.

(10) Patent No.: US 8,277,653 B2
(45) Date of Patent: Oct. 2, 2012

(54) POWER RECOVERY CHAMBER

(75) Inventors: Masao Shinoda, Fujisawa (JP); Kenichi Hoshino, Fujisawa (JP); Akira Goto, Ohta-ku (JP); Hideki Kanno, Ohta-ku (JP)

(73) Assignee: Ebara Corporation, Tokyo (JP)

( * ) Notice: Subject to any disclaimer, the term of this patent is extended or adjusted under 35 U.S.C. 154(b) by 611 days.

(21) Appl. No.: 12/415,345

(22) Filed: Mar. 31, 2009

(65) Prior Publication Data
US 2009/0242471 A1 Oct. 1, 2009

(30) Foreign Application Priority Data

Mar. 31, 2008 (JP) ................................. 2008-091052

(51) Int. Cl.
*B01D 65/00* (2006.01)
*F16J 1/04* (2006.01)

(52) U.S. Cl. .................. 210/258; 210/137; 210/170.11; 210/321.66; 210/416.1; 92/169.1; 92/172; 417/313; 417/379; 417/390; 417/392; 417/403

(58) Field of Classification Search .................. 210/137, 210/170.11, 321.6, 321.65, 321.66, 416.1, 210/416.3, 637, 652, 258; 417/313, 374, 417/379, 390, 392, 399, 400, 401, 403, 460, 417/466, 393, 404; 92/172, 181 R, 169.1
See application file for complete search history.

(56) References Cited

U.S. PATENT DOCUMENTS

| | | | | |
|---|---|---|---|---|
| 3,146,684 A | * | 9/1964 | Vanderhoof | 92/163 |
| 3,713,755 A | * | 1/1973 | Scheffer | 417/258 |
| 4,187,173 A | * | 2/1980 | Keefer | 210/652 |
| 4,876,945 A | * | 10/1989 | Stoll et al. | 92/5 R |
| 5,306,428 A | | 4/1994 | Tonner | |
| 5,797,429 A | | 8/1998 | Shumway | |
| 6,017,200 A | * | 1/2000 | Childs et al. | 417/404 |
| 7,168,927 B2 | | 1/2007 | Brueckmann et al. | |
| 7,927,082 B2 | * | 4/2011 | Haudenschild | 417/539 |
| 2009/0110563 A1 | * | 4/2009 | Takita et al. | 417/53 |

* cited by examiner

Primary Examiner — Joseph Drodge
(74) Attorney, Agent, or Firm — Oblon, Spivak, McClelland, Maier & Neustadt, L.L.P.

(57) ABSTRACT

A power recovery chamber is used for a positive-displacement power recovery apparatus in the seawater desalination plant or system. The power recovery chamber includes a cylinder, a piston disposed in the cylinder and capable of being reciprocated in a longitudinal direction of the cylinder, and a piston guide disposed in the cylinder and extending in the longitudinal direction of the cylinder for guiding the piston when the piston is reciprocated in the longitudinal direction of the cylinder. At least a part of an outer circumferential surface of the piston is out of contact with an inner surface of the cylinder, and the piston is brought into contact with the piston guide at a part where the piston guide passes through the piston.

20 Claims, 26 Drawing Sheets

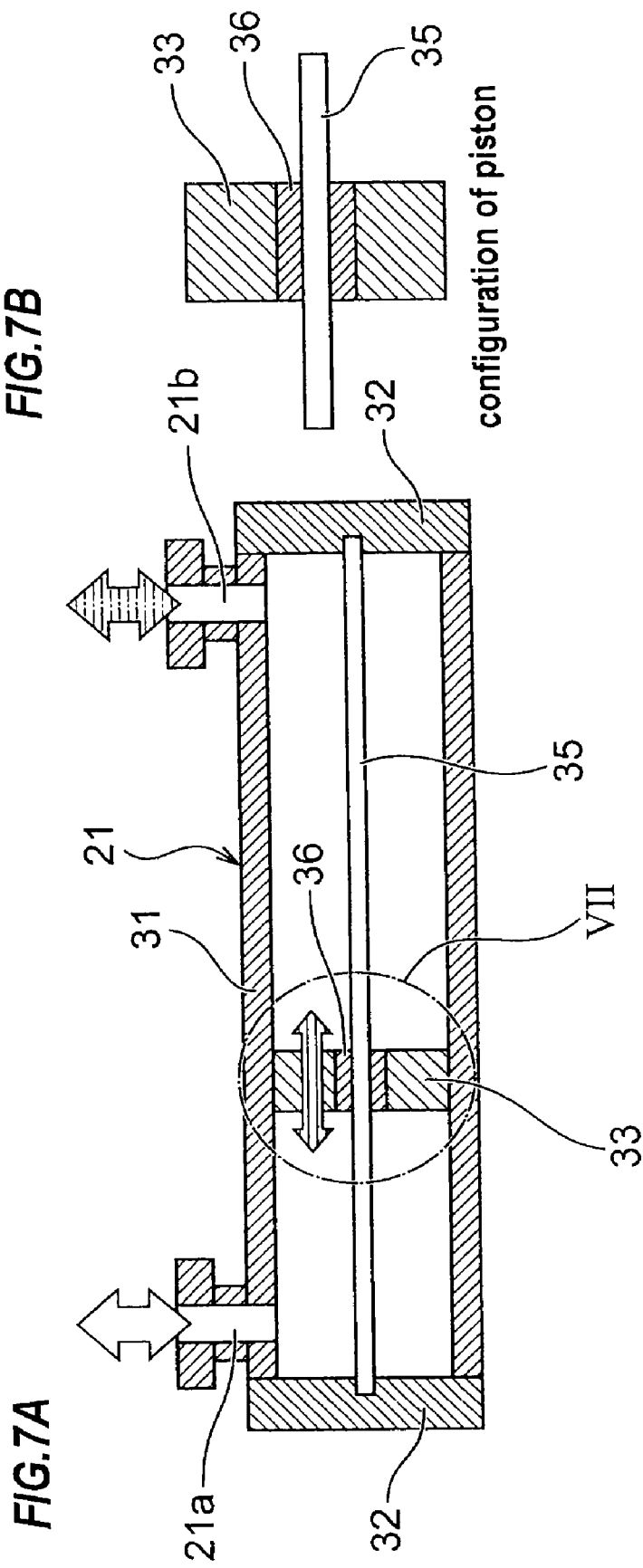

POWER RECOVERY CHAMBER

BACKGROUND OF THE INVENTION

1. Field of the Invention

The present invention relates to a power recovery apparatus for use in a seawater desalination plant or a seawater desalination system for desalinating seawater by removing salinity from the seawater. Particularly, the present invention relates to a power recovery chamber which is preferably used for a positive-displacement power recovery apparatus in the seawater desalination plant or system, can improve reliability of the seawater desalination plant or system, can operate the seawater desalination plant or system at high efficiency (energy-saving), and can recover fresh water by the seawater desalination plant or system at high efficiency.

2. Description of the Related Art

A seawater desalination plant which employs a reverse osmosis membrane method is composed mainly of a pretreatment system, a high-pressure pump, a reverse osmosis membrane cartridge, and a power recovery apparatus. When seawater is introduced into the seawater desalination plant, the seawater is processed to have certain water qualities by the pretreatment system, and then delivered into the reverse osmosis membrane cartridge under pressure by the high-pressure pump. Part of the high-pressure seawater in the reverse osmosis membrane cartridge passes through the reverse osmosis membrane against the reverse osmosis pressure and is desalinated, and fresh water is taken out from the reverse osmosis membrane cartridge. The remaining concentrated seawater with a high salt content is discharged as a reject from the reverse osmosis membrane cartridge. The largest operational cost (electric expenses) in the seawater desalination plant is energy cost for pressurizing the pretreated seawater up to such a pressure as to overcome the osmotic pressure, i.e. up to the reverse osmosis pressure. That is, the operational cost of the seawater desalination plant depends heavily on pressuring energy of the seawater by the high-pressure pump.

Specifically, more than half of the electric expenses as the highest cost in the seawater desalination plant are consumed to operate the high-pressure pump for pressuring the seawater. Therefore, the power recovery apparatus for effectively recovering the pressure energy from the high-pressure reject with the high salt content which has been discharged from the reverse osmosis membrane cartridge has a significant role.

FIG. 22 is a schematic view showing an example of a seawater desalination plant which employs a reverse osmosis membrane method. As shown in FIG. 22, when seawater 1 is pumped into the seawater desalination plant by an intake pump 2, the seawater 1 is processed to have certain water qualities by a pretreatment system 3, and then pressurized and delivered via a high-pressure line 7 into a reverse osmosis membrane cartridge 8 by a high-pressure pump 5 that is driven by an electric motor 6. Part of the seawater in a high-pressure chamber 9 of the reverse osmosis membrane cartridge 8 passes through a reverse osmosis membrane 10 against the reverse osmosis pressure and is desalinated, and then desalinated water 12 is taken out from the reverse osmosis membrane cartridge 8. The remaining concentrated seawater with a high salt content is discharged under pressure as high-pressure reject 13 from the reverse osmosis membrane cartridge 8 into a concentrated seawater line. The high-pressure reject (high-pressure concentrated seawater) 13 discharged from the reverse osmosis membrane cartridge 8 is introduced into a power recovery apparatus 23.

The power recovery apparatus 23 utilizes a positive-displacement power recovery apparatus as a measure (system) for operating the seawater desalination plant at high efficiency by effectively recovering and utilizing pressure energy of the high-pressure reject 13 with the high salt content.

Examples of conventional positive-displacement power recovery apparatuses are disclosed in U.S. Pat. Nos. 5,306,428 and 5,797,429.

FIG. 23 is a schematic view showing an example of a conventional positive-displacement power recovery apparatus. The positive-displacement power recovery apparatus is mainly composed of a directional control valve 20, two power recovery chambers 21, and a check valve module 22.

The function of the positive-displacement power recovery apparatus is as follows:

(1) The high-pressure reject 13 from the reverse osmosis membrane cartridge 8 is introduced into the directional control valve 20.

(2) The high-pressure reject 13 is introduced alternately into the two power recovery chambers 21 by actuation of the directional control valve 20.

(3) The piston in the power recovery chamber 21 is driven.

(4) Seawater which has been introduced from the supply line 4 through the check valve module 22 into the power recovery chambers 21 is pressurized by driving of the piston.

(5) The seawater which has been pressurized in the power recovery chambers 21 is discharged through the check valve module 22 to the supply seawater bypass boost line 24, and is then introduced into the booster pump 27 which is driven by the electric motor 26. The reference numeral 25 represents a discharge line.

Because the positive-displacement power recovery apparatus is used in the seawater desalination plant, the flow rate of the pretreated seawater which is pressurized by the high-pressure pump can be reduced, and energy (flow rate, pressure) required for operating the seawater desalination plant can be reduced, resulting in high operational efficiency of the system.

FIG. 24 is a schematic view showing an example of the conventional power recovery chamber. As shown in FIG. 24, the power recovery chamber 21 comprises a cylinder 31 having a cylindrical shape, and a piston 33 which is reciprocated in the cylinder 31. The cylinder 31 has two intake and discharge ports 31a, 31b. The piston 33 is arranged to be movable in an axial direction in the cylinder 31.

The function of the power recovery chamber 21 is as follows:

(1) The piston 33 is driven by pressure of the high-pressure reject 13 introduced through the directional control valve 20 into one side of the power recovery chamber 21 to boost the seawater introduced by the intake pump 2 into the other side of the power recovery chamber 21.

(2) The piston 33 is driven by discharge pressure of the intake pump 2 to discharge the reject which has been introduced into one side of the power recovery chambers 21 through the directional control valve 20 to the discharge line 25.

Specifically, in the power recovery chamber 21, the following cycle is performed:

(1) Introduction of the seawater →(2) Driving of the piston by introduction of the high-pressure reject→(3) Boosting of the seawater→(1) Introduction of the seawater That is, the cycle of (1)→(2)→(3) is repeated to perform introduction of the fluid and discharge of the fluid.

The cycle of (1)→(2)→(3) may be expressed in different words as follows:

(A) In FIG. 24, when the piston 33 moves from the left end to the right end of the cylinder 31, introduction of the seawater and discharge of the concentrated seawater (reject) are performed.

(B) When the piston 33 moves from the right end to the left end of the cylinder 31, the seawater is boosted by introduction of the high-pressure concentrated seawater (high-pressure reject).

(C) The two cylinders 31 alternate between (A) and (B) to recover the power of the high-pressure concentrated seawater having a certain pressure and a certain flow rate in the manner in which the seawater having a constant flow rate is boosted.

The conventional power recovery chamber of the positive-displacement power recovery apparatus as typified by U.S. Pat. Nos. 5,306,428 and 5,797,429 has the following disadvantages:

(1) In the conventional power recovery chamber, the outer circumferential surface of the piston is brought into sliding contact with the inner circumferential surface of the cylinder. In particular, in the power recovery chamber formed for the purpose of processing the large flow rate, the area of the sliding surface of the piston (in proportion to the diameter of the piston) and the range of reciprocating motion of the piston (stroke) become large. As an example of the dimension of the power recovery chamber, the inner diameter of the cylinder (≈ outer diameter of the piston) is about 0.4 m, and the length of the chamber is about 7 m. As is apparent from this example, the power recovery chamber is large in size, and it is highly likely that frictional wear (wear caused by friction) is generated in one of the sliding surfaces of the cylinder and the piston or both of the sliding surfaces of the cylinder and the piston.

Further, the incidence rate of the frictional wear is greatly related to sliding area A, sliding velocity V, and contact pressure P. Specifically, as sliding area A or contact pressure P in the sliding portion is larger and sliding velocity V is higher, the progression rate and the incidence rate of the wear increases. Abrasion powder is produced by the frictional wear. Specifically, as each of sliding area A, sliding velocity V, and contact pressure P is larger, the abrasion powder increases in quantity (hereinafter, this relation is referred to as "relation 1").

(2) The friction loss generated at the sliding surfaces when the piston is moved in the power recovery chamber is related to the sliding area A of the piston which is brought in sliding contact with the inner surface of the cylinder. As the sliding area A is larger, the friction loss increases. The increase of the friction loss causes a decrease of pressure rising of the seawater in the power recovery chamber, and thus the required energy recovery efficiency cannot be obtained. That is, the larger the sliding area A is, the larger the friction loss is (hereinafter, this relation is referred to as "relation 2").

PV value is used as general parameter of frictional wear condition. The PV value is expressed by the product of contact pressure P and sliding velocity V. The larger the PV value is, the larger the friction loss of the sliding part is, and the larger the generation of abrasion powder is. Specifically, the larger the PV value as the general parameter is, the larger the friction loss of the sliding part is, and the larger the generation of abrasion powder is (hereinafter, this relation is referred to as "relation 3").

As presented above, in the power recovery chamber having a predetermined length in a thrust direction (axial direction of cylinder) and having a piston, if the flow rate of fluid to be handled is the same, the following relationship is established.

(1) If the inner diameter of the cylinder (≈outer diameter of the piston) is large, the sliding velocity V becomes low, and the sliding area A becomes large.

(2) If the inner diameter of the cylinder (≈outer diameter of the piston) is small, the sliding velocity V becomes high, and the sliding area A becomes small.

Further, the relationship between the sliding area A and the friction loss or the generation of abrasion powder is summarized as follows:

Sliding area A; large→i) friction loss; large, ii) generation of abrasion powder; large Sliding area A; small→i) friction loss; small, ii) generation of abrasion powder; small Further, if the sliding velocity V is high (or low) as indicated in the relation 1, the generation of abrasion powder becomes large (or small).

Specifically, in the conventional power recovery chamber, trade-off (antinomic phenomenon) between the sliding velocity V and the sliding area A cannot be solved, and thus the problems described in the above (1) and (2) are presented under existing circumstances.

Specifically, the problems are summarized as follows:

(A) Because either the sliding velocity V or the sliding area A becomes large, the problem of "wear" on the basis of "relation 1" cannot be solved. (B) With respect to the problem of "friction", if the sliding area A is small, even if the sliding velocity V becomes large (high), the problem of "friction" can be improved if only the above "relation 2" is established. However, because there is "relation 3", even if the sliding area A becomes small, the problem of "friction" cannot be improved.

Accordingly, abrasion powder of one of the cylinder and the piston or both of the cylinder and the piston produced by the above frictional wear enters constituent equipment of the system, and the performance of the constituent equipment deteriorates rapidly to shorten the service life of the system or to cause impairment of the constituent equipment. Consequently, it is highly likely that the operation of the system is shut down. In particular, the seawater desalination system or plant is closely tied with people's daily lives, and thus a serious problem arises when the seawater desalination system has some trouble.

(3) In order to avoid the above problems (1) and (2), in some cases, the combination of materials having low frictional wear characteristic under lubrication of seawater is applied to the cylinder and the piston. As an example of such materials, there are ceramics, resin, engineering plastics, and the like. However, because the chamber is very large in size as in the above example, it is difficult to obtain machined (or worked) components having suitable size. In particular, it is likely to exceed the limits of injection molding or coating treatment applied to different materials. Some materials are difficult to obtain because of size limitations.

If ceramics are used and processed, the cost of such processing is very expensive.

(4) As a measure for avoiding or suppressing the above problems (1) and (2), it is possible to make surface roughness of the sliding surfaces of the cylinder and the piston smooth (to make surface roughness small).

However, because the power recovery chamber is very large in size as in the above example, it is difficult to machine or process such chamber, and the cost of such processing Is very expensive.

(5) In order to avoid the above problem (2), i.e. the problem of friction loss, it is conceivable that the power recovery chamber having the form of no piston is applied to the seawater desalination system.

FIG. 25 is a schematic view showing an example of a power recovery chamber having the form of no piston. As shown in FIG. 25, a power recovery chamber 41 is in the form of closed container. The power recovery chamber 41 has two inlet and outlet ports 41a, 41b, and introduction or discharge of the concentrated seawater and the seawater to or from the power recovery chamber 41 is performed through the inlet and outlet ports 41a, 41b. In the power recovery chamber 41, a contact interface CI between the concentrated seawater and the seawater moves in the power recovery chamber 41 by pressure balance between the concentrated seawater and the seawater. Specifically, in the power recovery chamber 41, the contact interface CI serves as the piston 33 of the power recovery chamber 21 shown in FIG. 24.

The power recovery chamber 41 shown in FIG. 25 has a problem that salt content of the intake seawater becomes high in the power recovery chamber 41 by mixing of the concentrated seawater and the seawater at the contact interface CI. Thus, when the seawater pressurized in the chamber 41, i.e. the pressurized seawater and the intake seawater from the high pressure line are merged and introduced into the reverse osmosis membrane cartridge, salt content of the merged seawater becomes high. Accordingly, the freshwater recovery rate of the reverse osmosis membrane cartridge is lowered, and the service life of the reverse osmosis membrane cartridge is shortened.

Further, in order to keep the freshwater recovery rate of the reverse osmosis membrane, the introduction pressure of the seawater introduced into the reverse osmosis membrane cartridge (pressurizing rate by the high-pressure pump) is required to be higher than normal, resulting in lowering the operational efficiency of the system.

In addition, it is conceivable to make the diameter of the power recovery chamber smaller, thereby reducing contact area of the contact interface. However, in order to ensure the required flow rate of the intake seawater to be pressurized in the chamber, it is necessary to increase operation speed of the contact interface by a magnitude corresponding to the reduced diameter of the chamber. Therefore, it is necessary to increase switching operation speed of the directional control valve (see the directional control valve 20 shown in FIG. 23), and thus energy consumed by actuation of the directional control valve increases, resulting in increasing electric energy required for operation of the system.

Further, in addition to the above problems, when the directional control valve is stopped due to some trouble including malfunction, at least one contact interface of the two chambers disappears after such contact interface moves to the check valve module side. Thus, the chamber having no contact interface becomes a passage of the high-pressure concentrated seawater, and the concentrated seawater having high salt content merges into the intake seawater from the high-pressure pump, and is then introduced into the reverse osmosis membrane cartridge. Consequently, the freshwater recovery rate of the reverse osmosis membrane is lowered, and the service life of the reverse osmosis membrane cartridge is shortened.

(6) As equipment having the same function as the power recovery chamber, there is a double-acting double-rod cylinder. Therefore, it is conceivable to apply this double-acting double-rod cylinder to the seawater desalination system.

FIG. 26 is a schematic view showing an example of a power recovery chamber which employs a double-acting double-rod cylinder. As shown in FIG. 26, a power recovery chamber 51 comprises a cylinder 61 having a cylindrical shape, a piston 62 which is reciprocated in the cylinder 61, and piston rods 63 extending from both sides of the piston 62 in an axial direction. The chamber 51 has two intake and discharge ports 51a, 51b. The piston 62 is arranged so as to move in an axial direction in the cylinder 61 together with the piston rods 63.

As shown in FIG. 26, at least two packings 64 are mounted on the piston 62. In the case where the double-acting double-rod cylinder is used as the power recovery chamber, the packings 64 are worn or deteriorated, and therefore there is a problem that the power recovery efficiency is lowered because of leakage of working fluid, and the service life of the equipment is shortened.

SUMMARY OF THE INVENTION

The present invention has been made in view of the above problems in the art. It is therefore an object of the present invention to provide a power recovery chamber, for use in a positive-displacement power recovery apparatus utilized in a seawater desalination system, in which wear caused by friction in the power recovery chamber can be suppressed to reduce the generation of abrasion powder, thereby ensuring reliability of a seawater desalination plant, extending the service life of the power recovery chamber, reducing friction loss in the power recovery chamber, and reducing the production cost of the power recovery chamber.

In order to achieve the above object, according to a first aspect of the present invention, there is provided a power recovery chamber for use in a positive-displacement power recovery apparatus for recovering power at a low-pressure liquid side by boosting pressure of low-pressure liquid by transferring pressure of high-pressure liquid to the low-pressure liquid, the power recovery chamber comprising; a cylinder; a piston disposed in the cylinder and capable of being reciprocated in a longitudinal direction of the cylinder; a piston guide disposed in the cylinder and extending in the longitudinal direction of the cylinder for guiding the piston when the piston is reciprocated in the longitudinal direction of the cylinder; cylinder covers for covering both opening ends of the cylinder, the cylinder and the cylinder covers forming a liquid container; and openings formed in the cylinder or the cylinder covers for allowing the high-pressure liquid and the low-pressure liquid to pass therethrough, respectively; wherein at least a part of an outer circumferential surface of the piston is out of contact with an inner surface of the cylinder, and the piston is brought into contact with the piston guide at a part where the piston guide passes through the piston.

According to the present invention, a piston guide for guiding a piston in its moving direction and supporting the piston is provided in a cylinder constituting a power recovery chamber, and the piston is reciprocated along the piston guide. According to the present structure, the sliding portions in the power recovery chamber are limited to an outer circumferential surface of the piston guide and an inner surface of a perforated part, (for example, through-hole or the like) formed in the piston, where the piston guide passes through. For example, in the case where a piston bearing as a sliding member is provided on the piston, the sliding portions in the power recovery chamber are limited to an inner surface of the piston bearing disposed in the direction of the central axis of the piston and an outer circumferential surface of the piston guide.

Therefore, unlike the prior art, the outer circumferential surface of the piston is not brought into sliding contact with the inner surface of the cylinder, and hence a sliding area becomes very small and sliding velocity is not increased.

Thus, the generation of abrasion powder in the above problem (1) can be reduced, and friction loss in the above problem (2) can be also reduced greatly.

In the power recovery apparatus according to the present invention, an area of the contact interface between the concentrated seawater (reject) and the intake seawater in the power recovery chamber is very small, and thus the reverse osmosis membrane cartridge is not deteriorated any further, and the loss of energy required for desalination can be suppressed.

According to the present invention, the piston guide comprises a small-diameter shaft, and only the sliding surface of the piston sliding against the piston bearing can be coated with ceramics, resin or engineering plastics. In addition, a member for the sliding surface composed of ceramics, resin or engineering plastics may be formed by a discrete member separated from the piston, and may be fitted into the piston to construct a piston assembly. Therefore, it is possible to make the size of the sliding surface, i.e. the size of the member constituting the sliding surface smaller than that of the conventional member, and thus it is easy to obtain materials for such member and there are more choices of applicable materials. Accordingly, preferable materials can be used for the sliding surface.

Further, it is not necessary to perform machining or processing for making surface roughness of the inner surface of the cylinder constituting the power recovery chamber smooth (making surface roughness small), and it is possible to use general stainless steel pipe. Thus, the cost for machining (processing) and manufacturing the power recovery chamber can be reduced greatly.

Accordingly, there are more choices of applicable materials, and machining cost (processing cost) is reduced greatly. Further, it is possible to reduce the problem (3) and to avoid the problem (4), and thus the power recovery chamber capable of suppressing generation of abrasion powder and reducing friction loss can be provided inexpensively.

Further, in the power recovery chamber according to the present invention, an area of the contact interface between the high-pressure liquid and the low-pressure liquid is very small, and it is possible to suppress the problem (5). In the case where the power recovery chamber according to the present invention is applied to the seawater desalination plant, the freshwater recovery rate of the reverse osmosis membrane can be prevented from being lowered, the service life of the reverse osmosis membrane cartridge can be prevented from being shortened, and the operational efficiency of the seawater desalination system can be prevented from being lowered.

In a preferred aspect of the present invention, a thickness of radially outer part of the piston is smaller than a thickness of radially inner part of the piston to reduce mass of the piston.

In a preferred aspect of the present invention, the piston has a flange at both side surfaces facing the cylinder covers, the flange extends from a predetermined position of the piston in a radial direction to an outer circumferential surface of the piston, and the flange is configured to be deformed radially outward by differential pressure between the high-pressure liquid and the low-pressure liquid.

In a preferred aspect of the present invention, the piston comprises a piston base having the part where the piston guide passes through the piston, and a ring part extending radially outward from the piston base.

In a preferred aspect of the present invention, the piston has a sliding member at the part where the piston guide passes through the piston so that the sliding member is brought into sliding contact with the piston guide.

In a preferred aspect of the present invention, the piston guide comprises a single rod having a uniform cross-section in a longitudinal direction of the piston guide, and a central axis of the cylinder and a centroid of a cross-section of the piston guide are aligned with each other. In this manner, because the piston guide is arranged such that the centroid of the cross-section of the piston guide is aligned with the central axis of the cylinder, in the case where the shape of the cross-section of the piston guide is circular or even if the shape of the cross-section of the piston guide is oblong or polygonal, the piston can be reciprocated in the cylinder smoothly. Both ends of the piston guide are supported by support members provided on the cylinder cover or the cylinder.

In a preferred aspect of the present invention, the piston guide comprises a plurality of rods each having a uniform cross-section in a longitudinal direction of the piston guide, and each rod is disposed such that a central axis of the cylinder and a centroid of a cross-section of the piston guide are parallel to each other. Both ends of each rod are supported by support members provided on the cylinder cover or the cylinder.

In a preferred aspect of the present invention, the piston has a plurality of grooves in a circumferential direction at the part where the piston guide passes through the piston.

In a preferred aspect of the present invention, a plurality of concavo-convex portions extending in a circumferential direction are formed in an outer circumferential surface of the piston along a longitudinal direction of the cylinder to form a labyrinth seal together with an inner surface of the cylinder.

In a preferred aspect of the present invention, a plurality of grooves extending in a circumferential direction are formed in an inner surface of the cylinder along a longitudinal direction of the cylinder.

In a preferred aspect of the present invention, at least one of an outer surface of the piston guide and an inner surface of the part of the piston where the piston guide passes through the piston is composed of one of stainless steel, ceramics and a high-polymer material.

In a preferred aspect of the present invention, an inner surface of the cylinder is composed of one of stainless steel, ceramics and a high-polymer material.

According to a second aspect of the present invention, there is provided a power recovery chamber for use in a positive-displacement power recovery apparatus for recovering power at a low-pressure liquid side by boosting pressure of low-pressure liquid by transferring pressure of high-pressure liquid to the low-pressure liquid, the power recovery chamber comprising: a cylinder having at least one projecting part in a longitudinal direction or at least one groove extending in a longitudinal direction; a piston disposed in the cylinder and capable of being reciprocated in a longitudinal direction of the cylinder, the piston having at least one fitting part which is fitted with the at least one projecting part or the at least one groove of the cylinder, the piston being configured to be guided by the projecting part or the groove when the piston is reciprocated; cylinder covers for covering both opening ends of the cylinder, the cylinder and the cylinder covers forming a liquid container; and openings formed in the cylinder or the cylinder covers for allowing the high-pressure liquid and the low-pressure liquid to pass therethrough, respectively; wherein at least a part of an outer circumferential surface of the piston is out of contact with an inner surface of the cylinder, and the piston is brought into contact with the projecting part or the groove of the cylinder.

According to the present invention, a projecting part in a longitudinal direction (or a groove extending in a longitudinal direction) for guiding a piston is provided in a cylinder constituting a power recovery chamber, and the piston is reciprocated along the projecting part in a longitudinal direction (or the groove extending in a longitudinal direction). According to the present structure, the sliding portions in the power recovery chamber are limited to a surface of the longitudinal projecting part (or longitudinal groove) of the cylinder and a surface of the fitting part formed in the piston. Therefore, unlike the prior art, the outer circumferential surface of the piston is not brought into sliding contact with the inner surface of the cylinder, and hence a sliding area becomes very small. Thus, the generation of abrasion powder in the above problem (1) can be reduced, and friction loss in the above problem (2) can be also reduced greatly. Further, only the sliding part of the piston, i.e. the surface of the fitting part can be coated with ceramics, resin or engineering plastics. In addition, it is possible to form only the sliding part of the piston as a discrete member separated from the piston body (i.e. the rest of the piston except for the sliding part of the piston) using other materials such as stainless steel, ceramics, resin or engineering plastics, and to construct a piston assembly by combining the piston body and the sliding part of the piston. Therefore, for the same reason as in the first aspect of the present invention described above, it is possible to reduce the problem (3) and to avoid the problem (4), and thus the power recovery chamber capable of suppressing generation of abrasion powder and reducing friction loss can be provided inexpensively.

Further, in the power recovery chamber according to the present invention, an area of the contact interface between the high-pressure liquid and the low-pressure liquid is very small, and it is possible to suppress the problem (5). In the case where the power recovery chamber according to the present invention is applied to the seawater desalination plant, the freshwater recovery rate of the reverse osmosis membrane can be prevented from being lowered, the service life of the reverse osmosis membrane cartridge can be prevented from being shortened, and the operational efficiency of the seawater desalination system can be prevented from being lowered.

According to a third aspect of the present invention, there is provided a seawater desalination system comprising: a high-pressure pump for pressuring seawater; a reverse osmosis membrane cartridge for treating high-pressure seawater discharged from the high-pressure pump with a reverse osmosis membrane to produce desalinated water; a positive-displacement power recovery apparatus for pressuring seawater under the pressure of concentrated seawater which is discharged from the reverse osmosis membrane cartridge without being treated by the reverse osmosis membrane; and a pressurizing apparatus for boosting the pressurized seawater discharged from the positive-displacement power recovery apparatus and adding the boosted seawater to the high-pressure seawater discharged from the high-pressure pump; wherein the positive-displacement power recovery apparatus comprises the power recovery chamber according to the first aspect of the present invention.

According to a fourth aspect of the present invention, there is provided a seawater desalination system comprising: a high-pressure pump for pressuring seawater; a reverse osmosis membrane cartridge for treating high-pressure seawater discharged from the high-pressure pump with a reverse osmosis membrane to produce desalinated water; a positive-displacement power recovery apparatus for pressuring seawater under the pressure of concentrated seawater which is discharged from the reverse osmosis membrane cartridge without being treated by the reverse osmosis membrane; and a pressurizing apparatus for boosting the pressurized seawater discharged from the positive-displacement power recovery apparatus and adding the boosted seawater to the high-pressure seawater discharged from the high-pressure pump; wherein the positive-displacement power recovery apparatus comprises the power recovery chamber according to the second aspect of the present invention.

According to the present invention, wear caused by friction in the power recovery chamber constituting a positive-displacement power recovery apparatus can be suppressed to reduce the generation of abrasion powder, thereby ensuring reliability of the seawater desalination plant and extending the service life of the power recovery chamber.

In the power recovery chamber according to the present invention, an area of the contact interface between the concentrated seawater (reject) and the intake seawater in the power recovery chamber is very small, and thus the reverse osmosis membrane cartridge is not deteriorated any further, and the loss of energy required for desalination can be suppressed because friction loss in the power recovery chamber can be reduced.

Next, the main characteristics of the present invention will be described below:

(1) Measure for reducing sliding area:
  The sliding area can be reduced remarkably by utilizing configuration of the piston guide. (2) Measure for reducing PV value:
  (A) If the inner diameter of the cylinder is the same, the sliding velocity V can be the same.
  (B) As for the contact pressure P, the mass of the piston is maintained small to make the contact pressure smaller than the conventional type. In this case, the contact pressure P should be at least equal to or less than the conventional type.
  (C) The PV value is reduced by the above (A) and (B). In this case, the PV value should be at least equal to or lower than the conventional value.

(3) In order to realize the above (B), it is necessary to make the length of the piston bearing in the axial direction longer than the length (thickness) of the piston (i.e., the piston body or the piston ring) in the axial direction. For example, in the case where the outer diameter of the piston guide is one fifth as large as that of the piston, without changing the length of the piston bearing, the length (thickness) of the piston body is set to be one fifth as long as that of the piston bearing. In other words, the piston body should be configured to have low mass.

By keeping the length of the piston bearing long, tilting of the piston can be also suppressed.

According to the present invention, by guiding the piston by the piston guide or the longitudinal projecting part (or longitudinal groove) provided in the cylinder, it is possible to reduce the sliding area (contact area) without increasing sliding velocity. Further, by making the mass of the piston small, it is possible to suppress contact pressure to a small value, thereby making the PV value small. Therefore, because both of the sliding area and the PV value can be small, both of friction loss and the generation of abrasion powder can be reduced. In addition, the production cost can be reduced because high-precision finish machining (finish processing) is not required and the size of necessary members can be small.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 7A is a schematic cross-sectional view showing a power recovery chamber according to a second embodiment of the present invention;

FIG. 7B is an enlarged view of VII part of FIG. 7A.

DETAILED DESCRIPTION OF THE PREFERRED EMBODIMENTS

Figure 1:
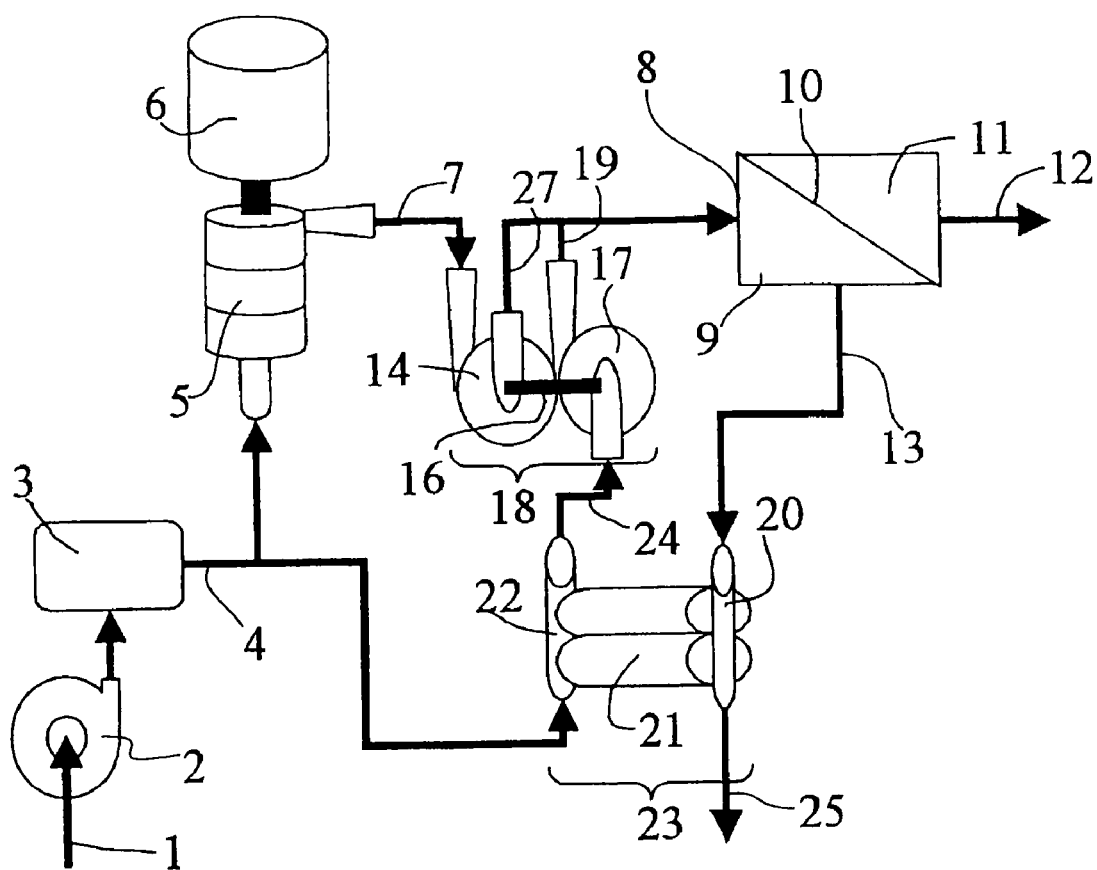
FIG. 1 is a schematic view showing a seawater desalination plant (seawater desalination system) which employs a power recovery chamber according to the present invention.

Power recovery chambers according to preferred embodiments of the present invention will be described in detail below with reference to FIGS. 1 through 21. Like or corresponding parts are denoted by like or corresponding reference numerals throughout drawings and will not be described below repetitively.

FIG. 1 is a schematic view showing a seawater desalination plant (seawater desalination system) which employs a power recovery chamber according to the present invention. As shown in FIG. 1, when seawater 1 is pumped into a seawater desalination plant by an intake pump 2, the seawater 1 is processed to have certain water qualities by a pretreatment system 3, and then pressurized and delivered through a high-pressure line 7 into a reverse osmosis membrane cartridge 8 by a high-pressure pump 5 that is driven by an electric motor 6. The high-pressure pump 5 may be controlled by a control valve or an inverter for flow rate control. Part of the seawater in a high-pressure chamber 9 of the reverse osmosis membrane cartridge 8 passes through a reverse osmosis membrane 10 against the reverse osmosis pressure and is desalinated, and then desalinated water 12 is taken out from the reverse osmosis membrane cartridge 8. The remaining concentrated seawater with a high salt content is discharged under pressure as a high-pressure reject (high-pressure concentrated seawater) 13 from the reverse osmosis membrane cartridge 8 into a concentrated seawater line. The high-pressure reject 13 discharged from the reverse osmosis membrane cartridge 8 is introduced into a positive-displacement power recovery apparatus 23. The reject from which the pressure energy has been removed is discharged as a low-pressure power-recovered reject 25. Part of the seawater from the pretreatment system 3 is supplied via a supply line 4 to the positive-displacement power recovery apparatus 23, and is then boosted by the positive-displacement power recovery apparatus 23 and discharged to a supply seawater bypass boost line 24.

The seawater discharged to the supply seawater bypass boost line 24 has been pressurized by the positive-displacement power recovery apparatus 23, but the pressure of the seawater in the supply seawater bypass boost line 24 is lower than the pressure of the seawater flowing to the reverse osmosis membrane cartridge 8. In the seawater desalination system which employs the power recovery chamber according to the present invention, in order to combine the seawater flowing from the high-pressure pump 5 to the reverse osmosis membrane cartridge 8 and the seawater supplied from the supply seawater bypass boost line 24 with each other, a power recovery pump turbine 18 is provided between the supply seawater bypass boost line 24 and a booster pump outlet line 19 which leads to the reverse osmosis membrane cartridge 8. The power recovery pump turbine 18 includes a turbine 14 having a turbine impeller and a booster pump 17 having a pump impeller. The turbine impeller and the pump impeller are coaxially coupled to each other by a rotational shaft 16. The turbine impeller is driven by a small amount of pressure energy possessed by the high-pressure seawater that is supplied from the high-pressure pump 5 into the high-pressure line 7, thereby rotating the pump impeller of the booster pump 17 to pump the seawater from the supply seawater bypass boost line 24 into the booster pump outlet line 19. The high-pressure seawater discharged from the turbine impeller flows into a turbine outlet line 27 that is connected to the booster pump outlet line 19. The power recovery apparatus thus constructed according to the present invention can dispense with the electric motor 26 required in the prior art (see FIG. 22), and also with the high-pressure seal structure of the booster pump 17. Therefore, the power recovery apparatus according to the present invention is relatively simple in structure and relatively inexpensive to manufacture.

Figure 2:
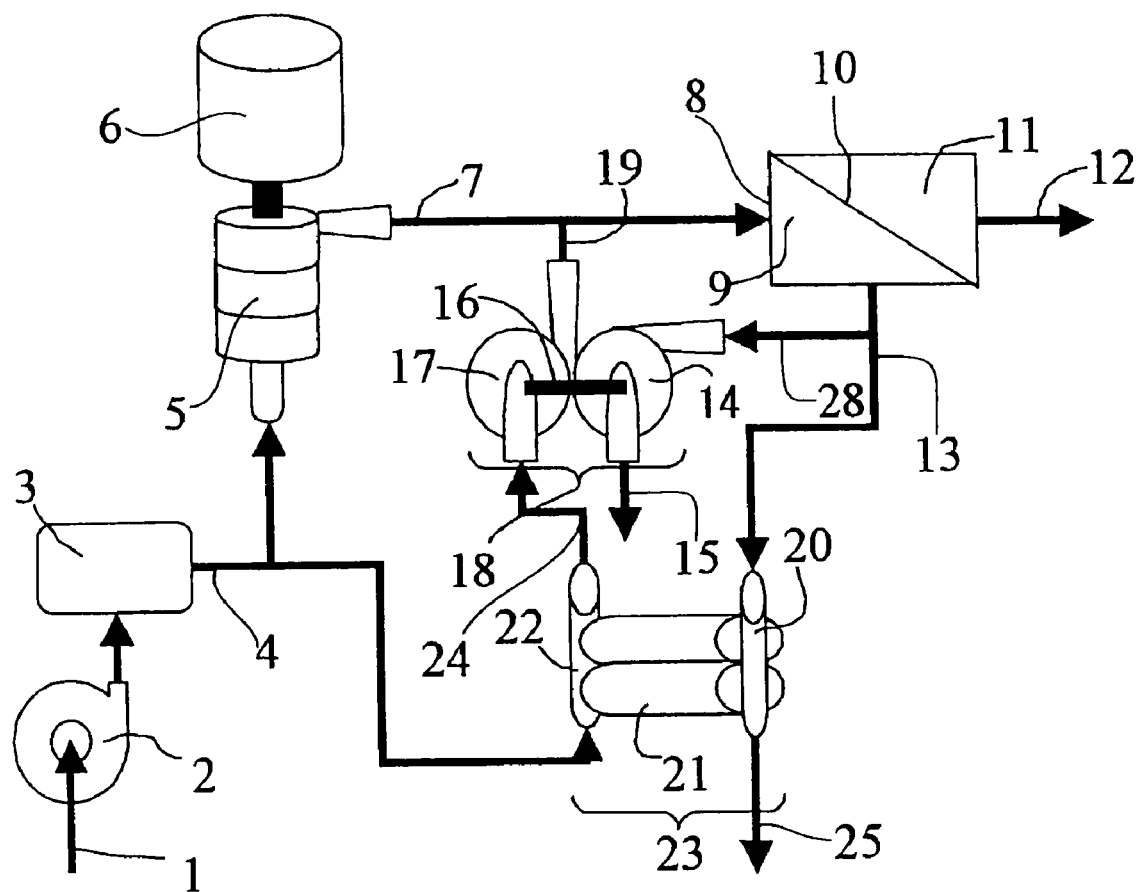
FIG. 2 is a schematic view showing another example of a seawater desalination plant (seawater desalination system) which employs a power recovery chamber according to the present invention.

FIG. 2 is a schematic view showing another example of a seawater desalination plant (seawater desalination system) which employs a power recovery chamber according to the present invention. As shown in FIG. 2, when seawater 1 is pumped into a seawater desalination plant by an intake pump 2, the seawater 1 is processed to have certain water qualities by a pretreatment system 3, and then pressurized and delivered via a high-pressure line 7 into a reverse osmosis membrane cartridge 8 by a high-pressure pump 5 that is driven by an electric motor 6. The high-pressure pump 5 may be controlled by a control valve or an inverter for flow rate control. Part of the seawater in a high-pressure chamber 9 of the reverse osmosis membrane cartridge 8 passes through a reverse osmosis membrane 10 against the reverse osmosis pressure and is desalinated, and then desalinated water 12 is taken out from the reverse osmosis membrane cartridge 8. The remaining concentrated seawater with a high salt content is discharged under pressure as a high-pressure reject (high-pressure concentrated seawater) 13 from the reverse osmosis membrane cartridge 8 into a concentrated seawater line. The high-pressure reject 13 discharged from the reverse osmosis membrane cartridge 8 is introduced into a positive-displacement power recovery apparatus 23. The reject from which the pressure energy has been removed is discharged as a low-pressure power-recovered reject 25. Part of the seawater from the pretreatment system 3 is supplied via a supply line 4 to the positive-displacement power recovery apparatus 23, and is then boosted by the positive-displacement power recovery apparatus 23 and discharged to a supply seawater bypass boost line 24.

The seawater discharged to the supply seawater bypass boost line 24 has been pressurized by the positive-displacement power recovery apparatus 23, but the pressure of the seawater in the supply seawater bypass boost line 24 is lower than the pressure of the seawater flowing to the reverse osmosis membrane cartridge 8. In the seawater desalination system which employs the power recovery chamber according to the present invention, in order to combine the seawater in the high-pressure line 7 and the seawater supplied from the supply seawater bypass boost line 24 with each other, a power recovery pump turbine 18 is provided between the supply seawater bypass boost line 24 and the high-pressure line 7. The power recovery pump turbine 18 includes a turbine 14 having a turbine impeller and a booster pump 17 having a pump impeller. The turbine impeller and the pump impeller are coaxially coupled to each other by a rotational shaft 16. The turbine impeller is driven by a small amount of concentrated seawater flowing in the concentrated seawater line 13 via a turbine inlet line 28, thereby rotating the pump impeller of the booster pump 17 to pump the seawater from the supply seawater bypass boost line 24 through the booster pump outlet line 19 into the high-pressure line 7.

Figure 22:
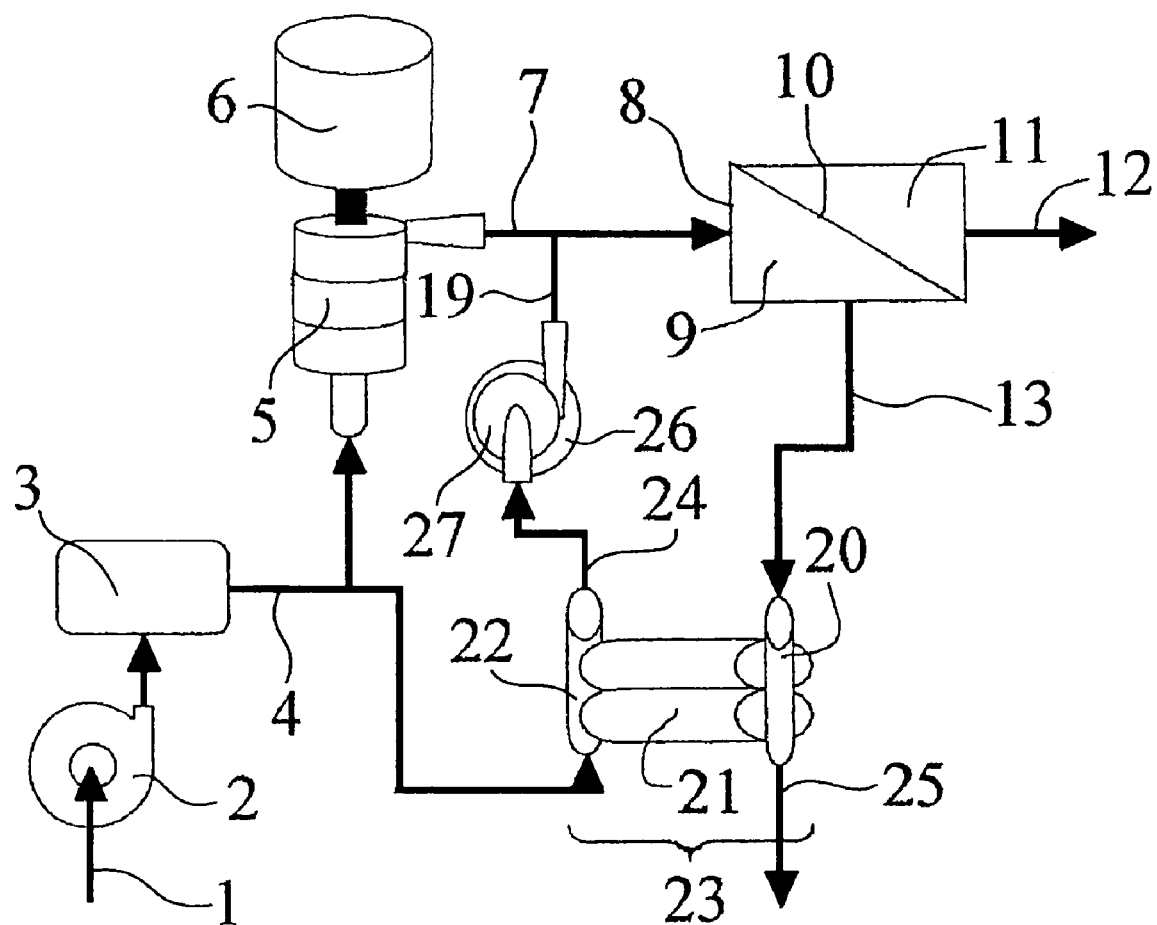
FIG. 22 is a schematic view showing an example of a conventional seawater desalination plant which employs a reverse osmosis membrane method.
Figure 23:
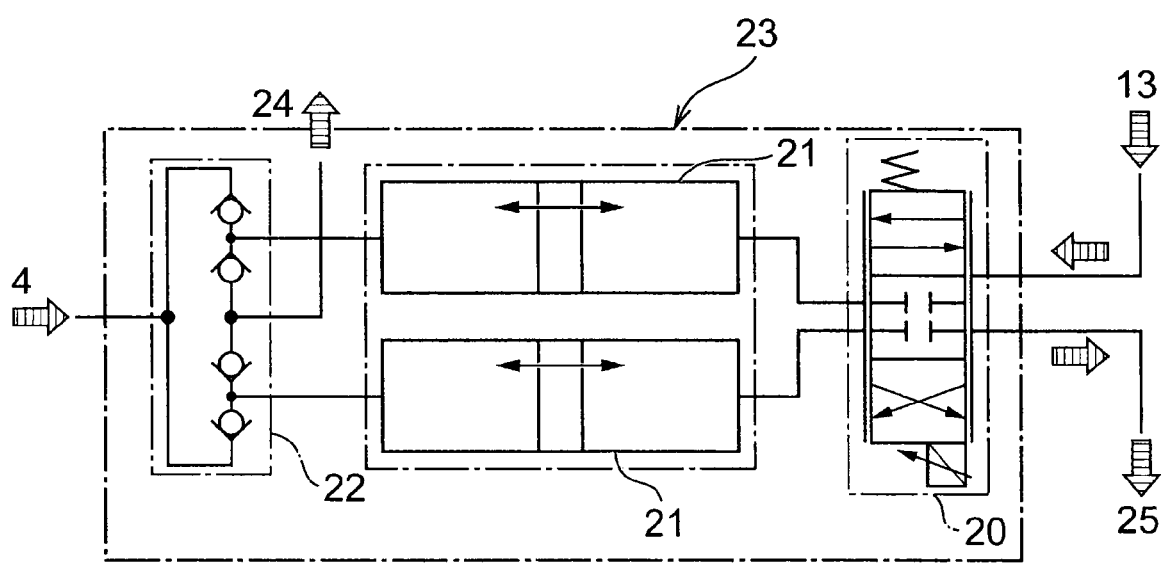
FIG. 23 is a schematic view showing an example of a conventional positive-displacement power recovery apparatus.
Figure 24:
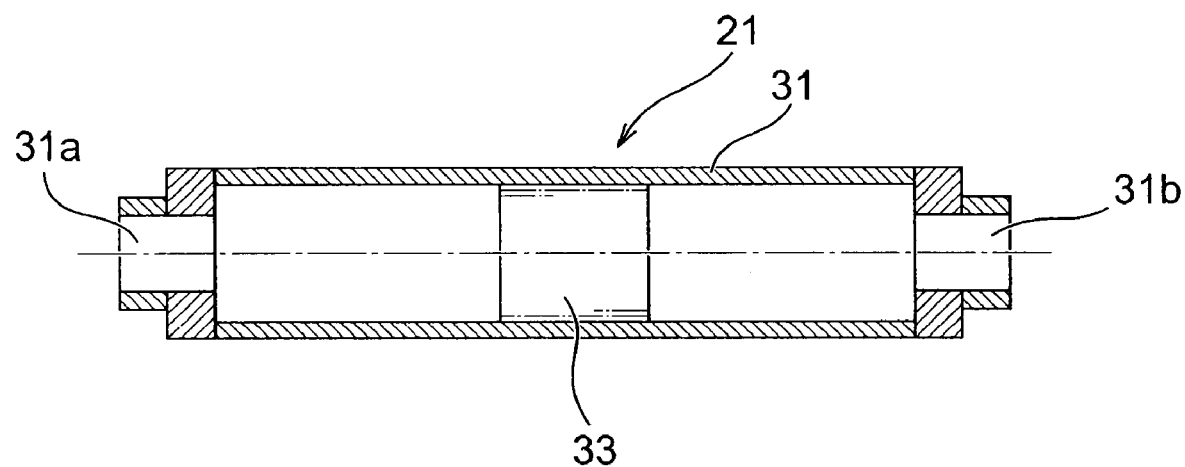
FIG. 24 is a schematic view showing an example of a conventional power recovery chamber.
Figure 25:
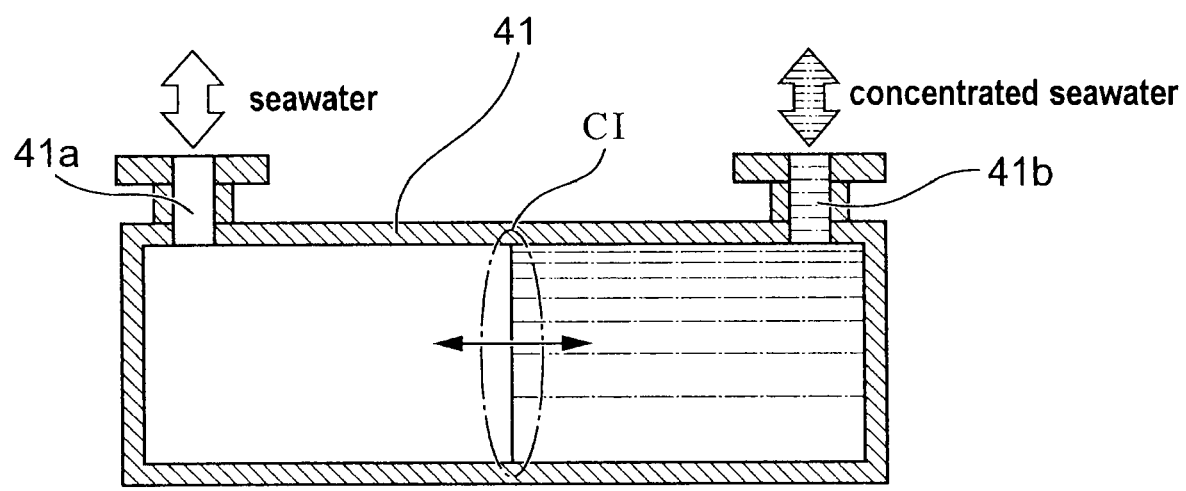
FIG. 25 is a schematic view showing an example of a conventional power recovery chamber having the form of no piston.
Figure 26:
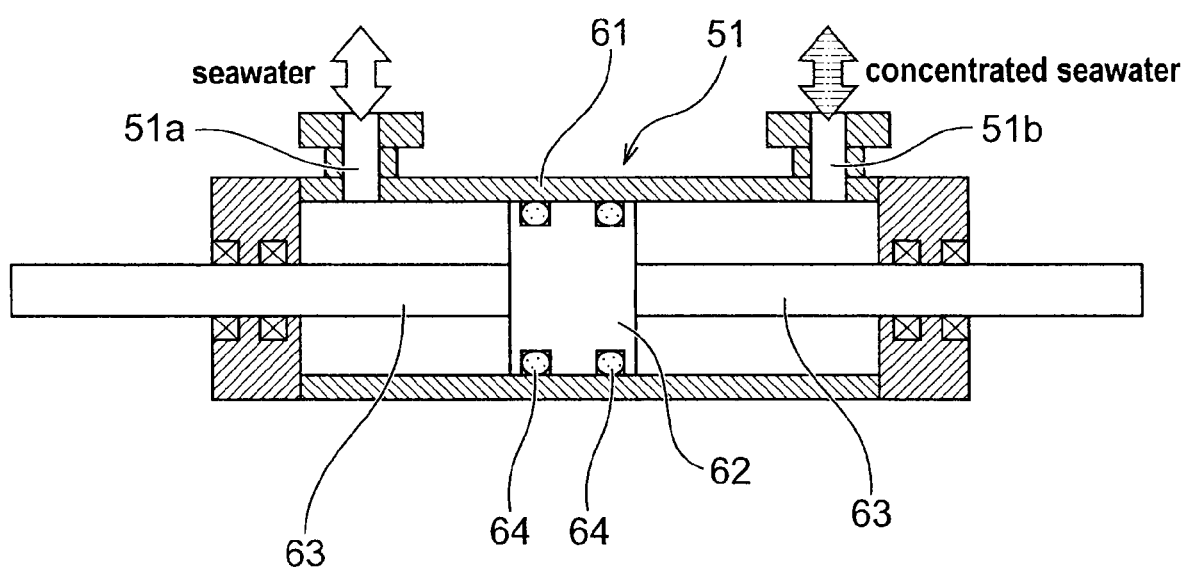
FIG. 26 is a schematic view showing an example of a power recovery chamber which employs a double-acting double-rod cylinder.

The power recovery apparatus according to the present invention can dispense with the electric motor 26 and an inverter, i.e., electric devices to be supplied with energy from an external source and their wirings, required in the prior art (see FIG. 22), and also with the high-pressure seal structure of the booster pump 17 which is problematic in the prior art (see FIG. 22). Therefore, the power recovery system according to the present invention is relatively simple in structure and relatively inexpensive to manufacture. As a result, the power recovery system is highly reliable as a whole. Furthermore, because part of the reject is discharged from the concentrated seawater line 13 via the turbine inlet line 28, the amount of seawater that is drawn from the supply line 4 into the positive-displacement power recovery apparatus 23 is reduced, resulting in an increase in the operating flow rate of the high-pressure pump 5. Consequently, it is possible to select a highly efficient pump as the high-pressure pump 5. According to the embodiment shown in FIG. 1, the head required for the high-pressure pump 5 needs to be increased by the energy required to drive the turbine impeller of the power recovery pump turbine 18. According to the embodiment shown in FIG. 2, however, there is no such need to increase the head of the high-pressure pump 5.

The power recovery pump turbine 18 is controlled by the flow rate of the seawater that flows into the turbine 14. Specifically, the turbine 14 is supplied with the concentrated high-pressure seawater which is discharged from the reverse osmosis membrane cartridge 8. The concentrated high-pressure seawater serves as an energy source and a constant pressure source, and is produced by the high-pressure pump 5. In other words, the power recovery pump turbine 18 is self-regulated under the fluid pressure within the power recovery system. Therefore, the power recovery pump turbine 18 according to the present invention has higher operability and controllability than the system in the prior art (see FIG. 22) in which the booster pump 17 is driven by the electric motor 26.

Figure 3:
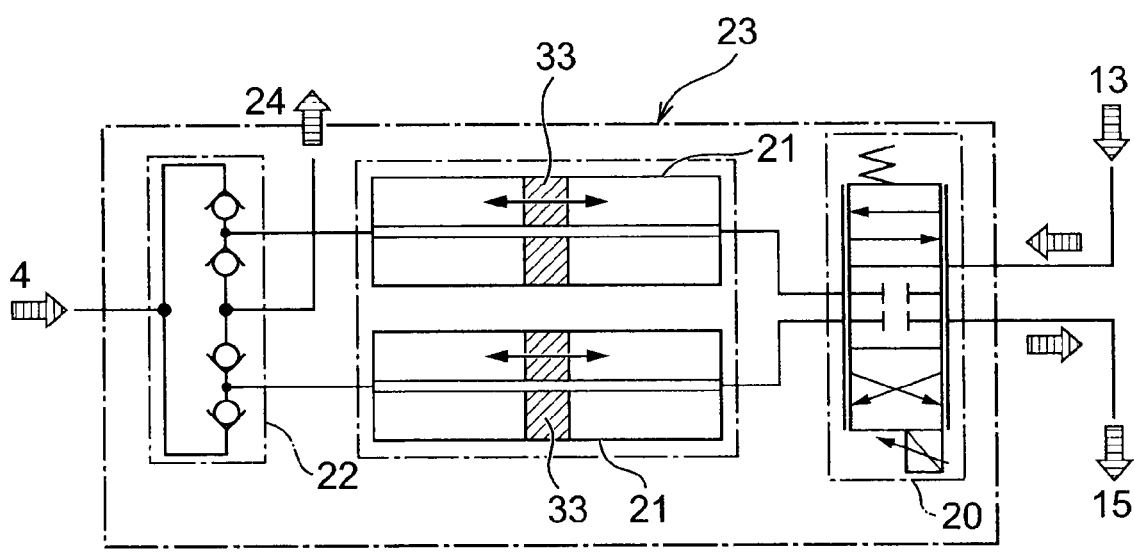
FIG. 3 is a schematic view showing a positive-displacement power recovery apparatus having power recovery chambers according to the present invention which is applied to the seawater desalination plant shown in FIGS. 1 and 2.

FIG. 3 is a schematic view showing a positive-displacement power recovery apparatus 23 having power recovery chambers according to the present invention which is applied to the seawater desalination plant shown in FIGS. 1 and 2. As shown in FIG. 3, the positive-displacement power recovery apparatus 23 is mainly composed of a directional control valve 20, two power recovery chambers 21 and a check valve module 22. In the positive-displacement power recovery apparatus 23, the high-pressure reject 13 from the reverse osmosis membrane cartridge 8 is introduced into the directional control valve 20, and then the high-pressure reject 13 is introduced alternately into the two power recovery chambers 21 by actuation of the directional control valve 20. Thus, the piston 33 in the power recovery chamber 21 is driven, and the seawater introduced from the supply line 4 through the check valve module 22 into the power recovery chamber 21 is pressurized (boosted) by movement of the piston 33. The pressurized seawater in the power recovery chamber 21 is discharged through the check valve module 22 to the supply seawater bypass boost line 24, and is then introduced into the booster pump 17 which is driven by the turbine 14 of the power recovery pump turbine 18.

Figure 4A:
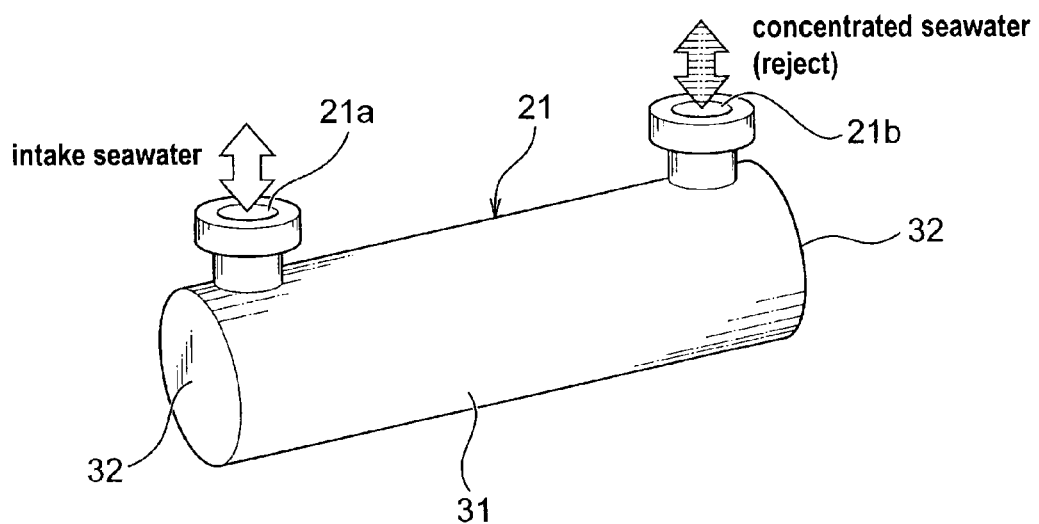
FIG. 4A is a perspective view showing a power recovery chamber according to a first embodiment of the present invention.
Figure 4B:
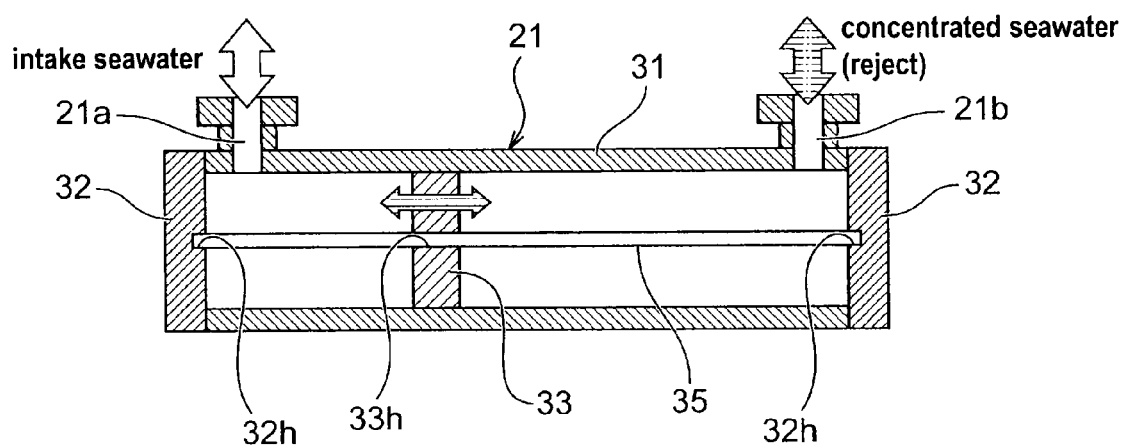
FIG. 4B is a schematic cross-sectional view showing the power recovery chamber according to a first embodiment of the present invention.

FIGS. 4A and 4B are views showing a power recovery chamber according to a first embodiment of the present invention. FIG. 4A is a perspective view of the power recovery chamber, and FIG. 4B is a schematic cross-sectional view of the power recovery chamber. As shown in FIGS. 4A and 4B, the power recovery chamber 21 comprises a cylinder 31 having a cylindrical shape, circular cylinder covers 32, 32 for covering both opening ends of the cylinder 31, a piston 33 which is reciprocated in the cylinder 31, and a piston guide 35 provided between the cylinder covers 32, 32 and extending through the central part of the cylinder 31. The piston guide 35 has both ends which are fixed to the centers of the cylinder covers 32 so that the piston guide 35 is located on a central axis of the cylinder 31. Each of the circular cylinder covers 32 has a hole 32h for fixing the piston guide 35 at the central part of the cylinder cover 32, and each end of the piston guide 35 is fitted into the hole 32h.

The power recovery chamber 21 has two inlet and outlet ports (opening postions) 21a, 21b, and introduction or discharge of the concentrated seawater and the seawater to or from the power recovery chamber 21 is performed through the inlet and outlet ports 21a, 21b.

Figure 5A:
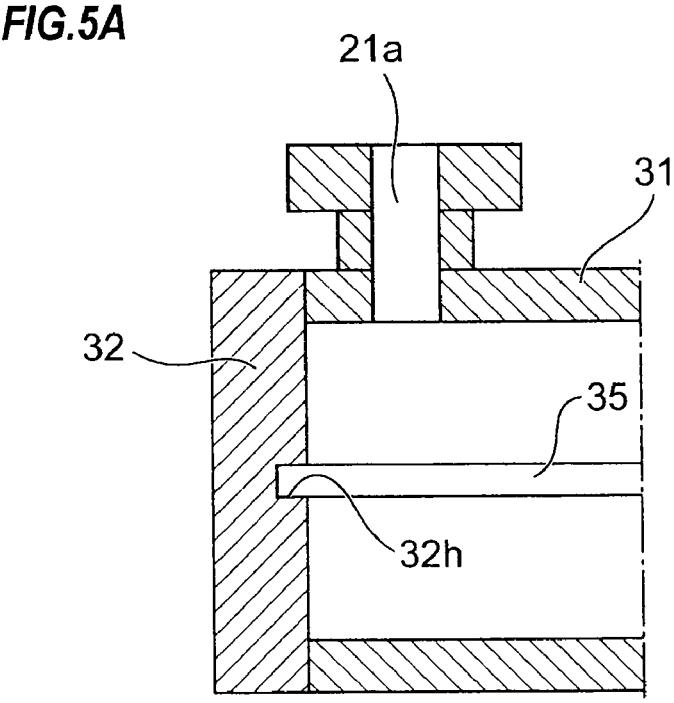
FIG. 5A is a cross-sectional view showing a fixing method for fixing a cylinder cover to a cylinder.
Figure 5B:
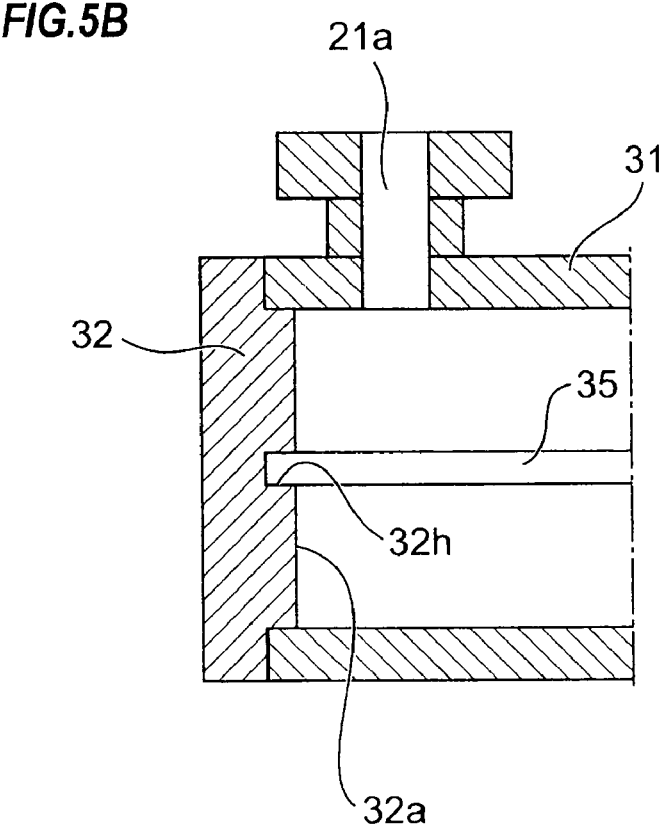
FIG. 5B is a cross-sectional view showing a fixing method for fixing a cylinder cover to a cylinder.

FIGS. 5A and 5B are views showing a fixing method for fixing the cylinder cover to the cylinder. As shown in FIG. 5A, the cylinder cover 32 may have a flat surface to which the cylinder 31 is fixed. As shown in FIG. 5B, the cylinder cover 32 may have a projecting portion 32a to which the cylinder 31 is fixed. If the cylinder cover 32 has the projecting portion 32a to which the cylinder 31 is fixed, the cylinder cover 32 and the cylinder 31 are fitted with each other in the concavo-convex form, thereby positioning both of the cylinder cover 32 and the cylinder 31. A positioning means such as a positioning pin may be provided on one of the cylinder cover 32 and the cylinder 31 for positioning both of the cylinder cover 32 and the cylinder 31. In short, if the central axis of the cylinder 31, the piston guide 35, and the fixing holes 32h of the cylinder covers 32 are disposed on the same axis, then the cylinder 31 and the cylinder covers 32 may be fixed by any method.

As shown in FIGS. 4A and 4B, a piston guide hole 33h for allowing the piston guide 35 to pass therethrough is formed in the piston 33, and is located on the central axis of the piston 33. According to the present embodiment of the present invention, when the piston 33 is reciprocated in the cylinder 31, the piston 33 is guided by the piston guide 35. The piston guide 35 comprises a small-diameter shaft having a circular cross-section. The shape of the cross-section of the piston guide may be preferably circular, but may be oblong or polygonal. The piston guide is arranged such that the centroid of the cross-section of the piston guide is aligned with the central axis of the cylinder. It is desirable that the shape of the piston guide hole formed in the piston is the same as the shape of the cross-section of the piston guide to allow the piston guide to pass therethrough smoothly. The piston guide hole is formed in the piston such that the centroid of the piston guide hole is aligned with the central axis of the piston.

According to the present embodiment of the present invention, the sliding portions in the power recovery chamber 21 correspond to an outer circumferential surface of the piston guide 35 and an inner circumferential surface of the piston guide hole 33h formed in the piston 33. Therefore, unlike the prior art, the outer circumferential surface of the piston is not brought into sliding contact with the inner circumferential surface of the cylinder, and hence a sliding area becomes very small. Thus, a large amount of abrasion powder in the above problem (1) can be prevented from being generated, and friction loss in the above problem (2) can be also reduced greatly.

The cross-section of the piston guide 35 is not limited to circular, and may be oblong, rectangular, triangular, or various in form depending on design specification or the like.

Further, in the power recovery chamber 21 according to the present invention, the contact interface between the concentrated seawater and the intake seawater corresponds to a contact area in the radial clearance between the piston 33 and the cylinder 31 and a contact area in the radial clearance between the piston 33 and the piston guide 35. Therefore, the mixed quantity of the concentrated seawater and the intake seawater is very small, and the above problem (5) can also be suppressed. Accordingly, the freshwater recovery rate of the reverse osmosis membrane can be prevented from being lowered, the service life of the reverse osmosis membrane cartridge can be prevented from being shortened, and the operational efficiency of the seawater desalination system can be prevented from being lowered.

Figure 6:
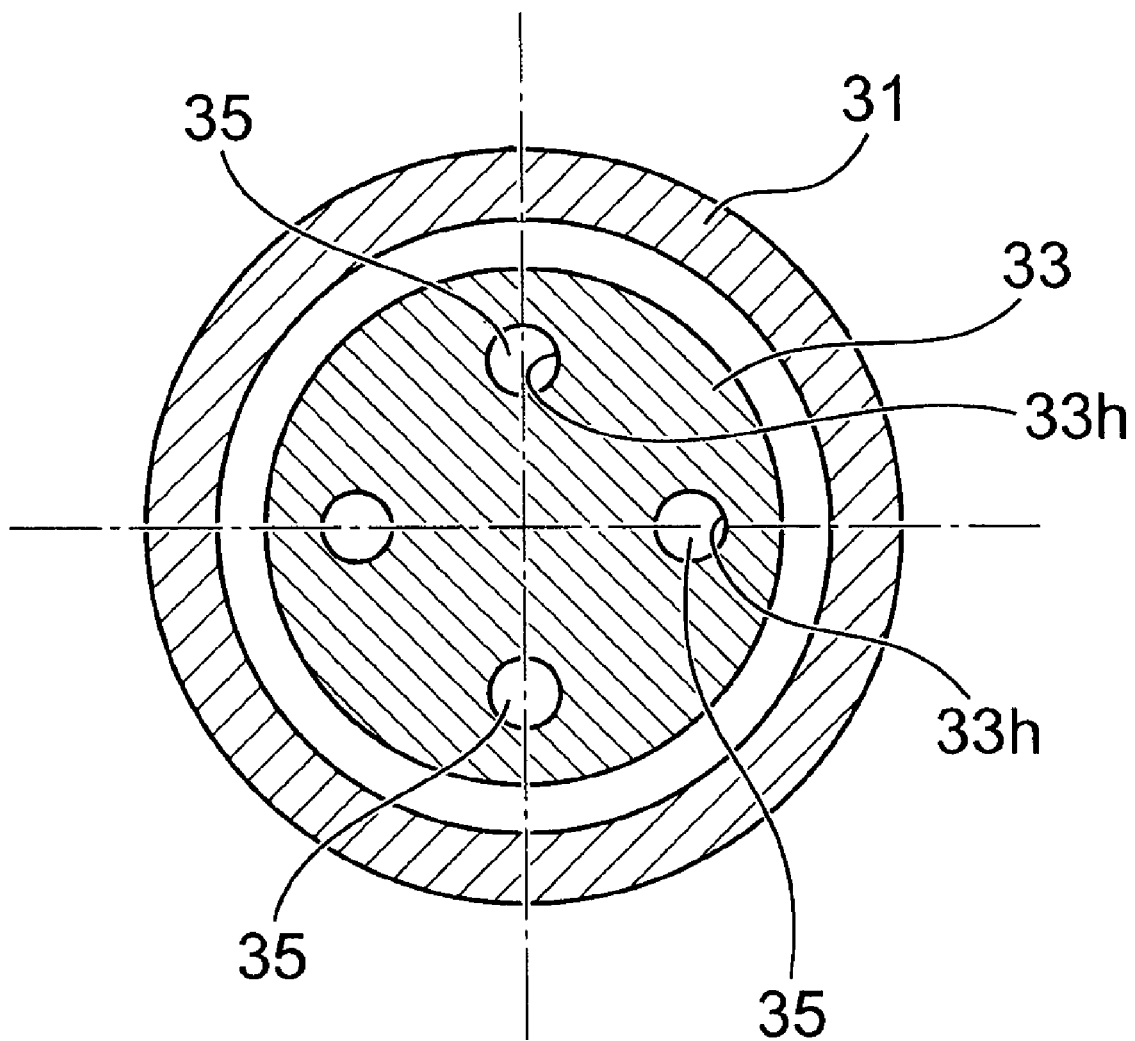
FIG. 6 is a view showing a modified example of the power recovery chamber shown in FIG. 3, and a vertical cross-sectional view of the power recovery chamber along a radial direction of the chamber.

FIG. 6 is a view showing a modified example of the power recovery chamber shown in FIG. 3, and a vertical cross-sectional view of the power recovery chamber along a radial direction of the chamber. As shown in FIG. 6, a plurality of piston guides 35 are provided (four piston guides 35 are provided in FIG. 6), and the piston 33 has a plurality of piston guide holes 33h for allowing the piston guides 35 to pass therethrough (four piston guide holes 33h are provided in FIG. 6).

FIGS. 7A and 7B are views showing a power recovery chamber according to a second embodiment of the present invention. FIG. 7A is a schematic cross-sectional view of the power recovery chamber, and FIG. 7B is an enlarged view of VII part of FIG. 7A. As shown in FIGS. 7A and 7B, the power recovery chamber according to the second embodiment of the present invention is different from the power recovery chamber according to the first embodiment of the present invention in the configuration of piston. As shown in FIGS. 7A and 7B, in the piston 33 according to the second embodiment, a piston bearing 36 constituting a sliding member is provided on a sliding surface sliding against the piston guide 35. As a method for fixing the piston bearing 36 to the piston 33, adhesive bonding, shrink fitting, cooled fitting, screw cramp, or other measures may be used. In short, if the piston bearing 36 is fitted in the central axis part of the piston 33 and fixed thereto, any method may be used.

According to the present embodiment, because the sliding part in the piston is limited only to the piston bearing 36, ceramics, resin or engineering plastics may be coated on the sliding part (piston bearing). In addition, a member for the piston bearing composed of ceramics, resin or engineering plastics may be formed by a discrete member separated from the piston, and may be fitted into the piston to construct a piston assembly. Therefore, the piston has more choices of applicable materials, and the inner surface of the cylinder 31 is not required to be processed or machined with high accuracy (to make surface roughness small). Thus, machining cost (processing cost) is reduced, and it is possible to avoid the problems (3) and (4).

Further, in the power recovery chamber 21 according to the present invention, the contact interface between the concentrated seawater and the intake seawater corresponds to a contact area in the radial clearance between the piston 33 and the cylinder 31 and a contact area in the radial clearance between the piston bearing 36 and the piston guide 35. Therefore, the mixed quantity of the concentrated seawater and the intake seawater is very small, and the above problem (5) can also be suppressed. Accordingly, the freshwater recovery rate of the reverse osmosis membrane can be prevented from being lowered, the service life of the reverse osmosis membrane cartridge can be prevented from being shortened, and the operational efficiency of the seawater desalination system can be prevented from being lowered.

Figure 8A:
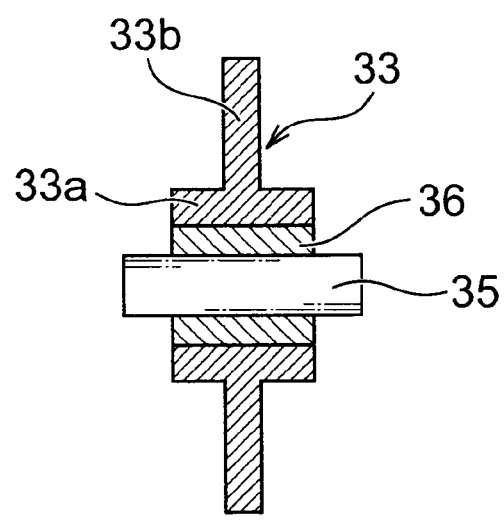
FIGS. 8A and 8B are schematic cross-sectional views showing examples of other shapes of the piston in the power recovery chamber according to the second embodiment of the present invention.
Figure 8B:
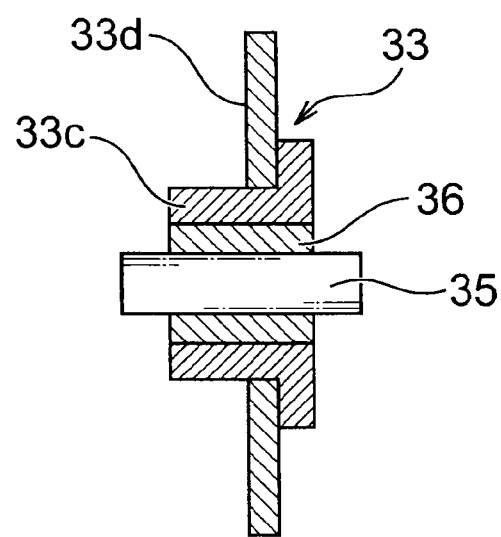

FIGS. 8A and 8B are schematic cross-sectional views showing examples of other shapes of the piston in the power recovery chamber according to the second embodiment of the present invention. In the example shown in FIG. 8A, a piston 33 comprise a cylindrical sliding part 33a on which a piston bearing 36 is mounted, and a circular plate part 33b having a thin-plate shape extending radially outwardly from the cylindrical sliding part 33a. According to this structure, the piston 33 becomes thin, and the amount of material to be used for the piston 33 can be reduced, and the weight of the piston can be reduced (lightweight of the piston). Further, contact pressure P produced in the contact surfaces of the piston bearing 36 and the piston guide 35 can be reduced, and the manufacturing cost can be also reduced.

If the power recovery chamber according to the present invention is installed with its longitudinal axis horizontally, the lightweight of the piston as described above has a great effect on reduction of the contact pressure.

Further, in the example shown in FIG. 8B, a piston 33 comprises a cylindrical piston base 33c on which a piston bearing 36 is mounted, and a piston ring 33d having a thin-plate shape. According to this structure, the piston 33 becomes thin. In this structure, a method in which the piston base 33c and the piston ring 33d are fixed to each other by using adhesive bonding, screw cramp, or the like, and sealing such as O-ring is interposed between the bonding surfaces to prevent a fluid from leaking through the clearance between the piston base 33c and the piston ring 33d may be used.

The thickness and length of the piston in the thrust direction is designed in consideration of applicable materials, formation of reinforcing rib, or the like so that the piston is not deformed when pressure is applied to the piston. In some cases, the piston base is composed of resin, or the piston base and the piston ring are composed of resin.

Figure 9A:
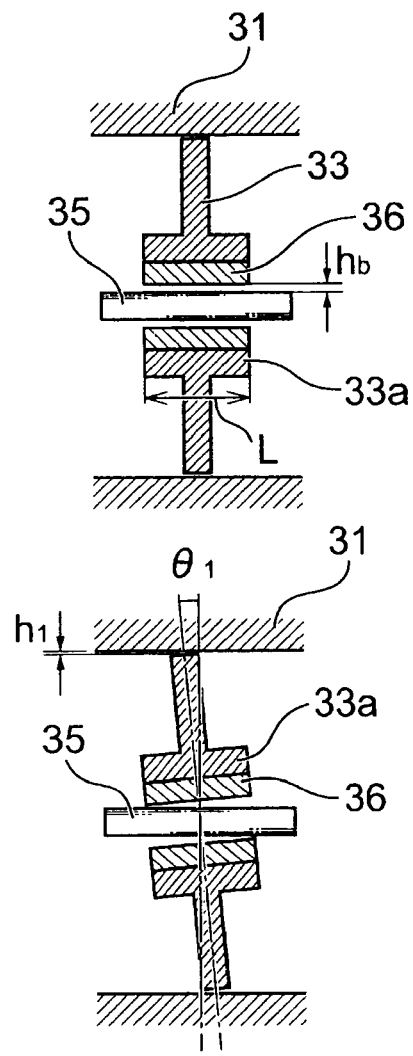
FIGS. 9A and 9B are schematic views showing operation of the power recovery chamber having the piston shown in FIGS. 8A and 8B.
Figure 9B:
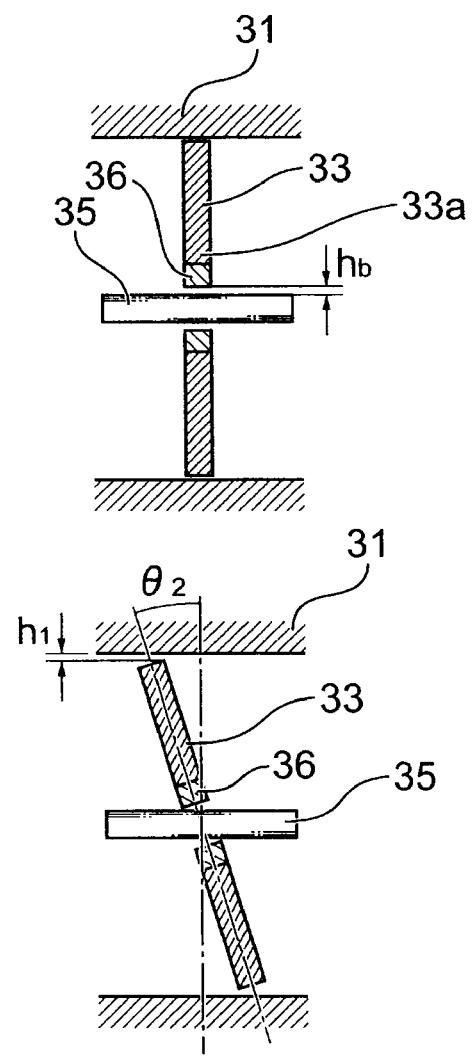

FIGS. 9A and 9B are schematic views showing operation of the power recovery chamber having the piston shown in FIGS. 8A and 8B. In FIGS. 9A and 9B, the state in which the piston 33 is not inclined is shown at the upper part of the drawing, and the state in which the piston 33 is inclined is shown at the lower part of the drawing. As shown in FIG. 9A, by keeping the length L of the sliding part 33a in the thrust direction (axial direction) of the piston 33 sliding against the piston guide 35 at a predetermined value, tilting of the piston 33 can be suppressed. For example, as in the case shown in FIG. 9B, in the case where the length of the sliding part 33a is shortened in the same length as the piston 33 in the thrust direction, the degree of tilting of the piston 33 becomes larger. Specifically, if a radial clearance between the piston 33 and the piston guide 35 is set to $h_b$=constant, then $\theta_1 \ll \theta_2$. Thus, the radial clearance between the outer circumferential surface of the piston 33 and the inner circumferential surface of the cylinder 33 becomes larger ($h_1 < h_2$), and the area of the contact interface between the concentrated seawater and the intake seawater increases. Accordingly, the salt content of the intake seawater becomes high, thus causing a problem that the reverse osmosis membrane is deteriorated further and the efficiency of the desalination is lowered.

In order to solve the above problem, as shown in FIG. 9A, it is necessary to keep the length L of the sliding part 33a in the thrust direction (axial direction) of the piston 33 sliding against the piston guide 35 at a predetermined value.

Figure 10:
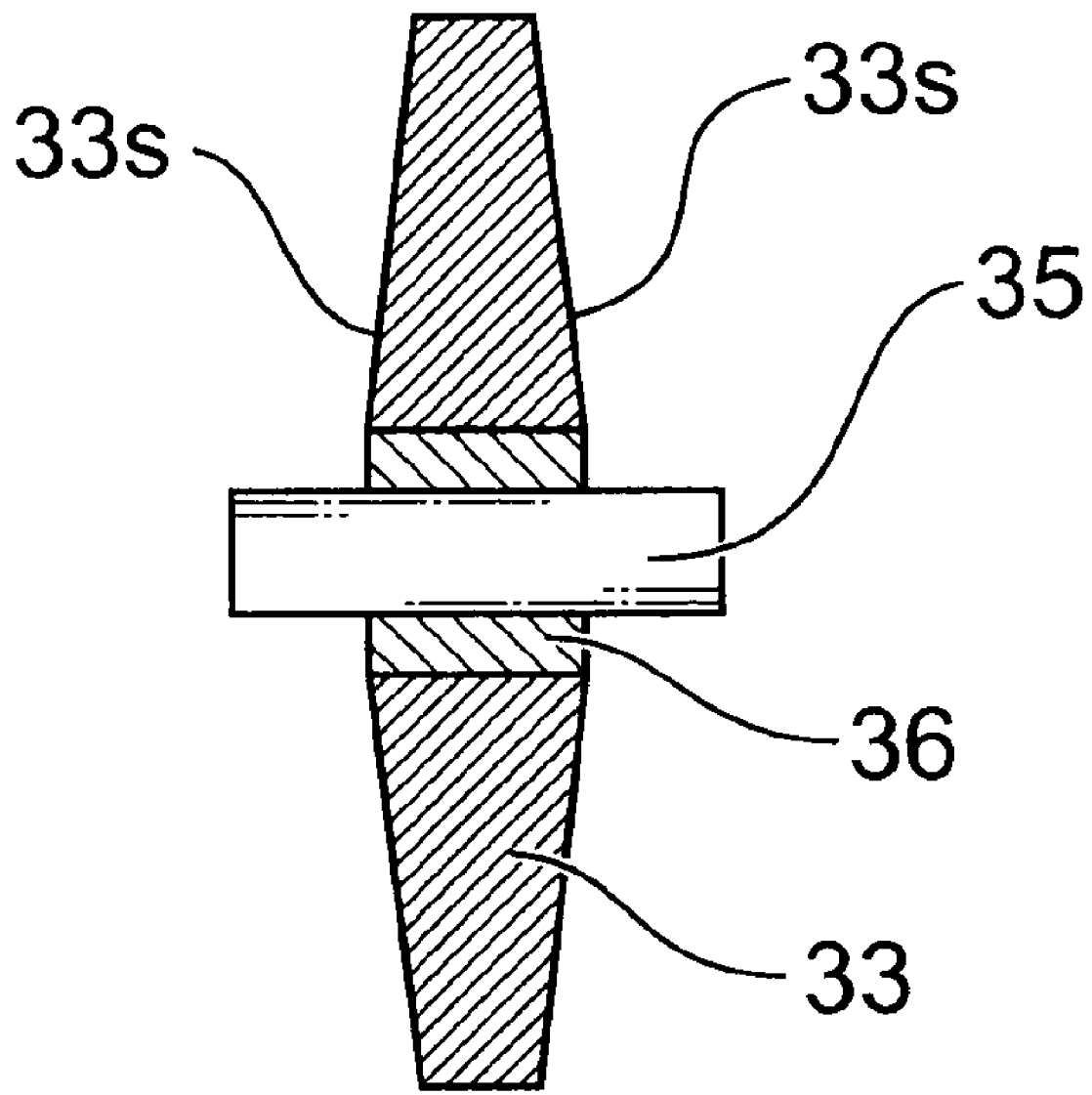
FIG. 10 is a schematic cross-sectional view showing a piston of the power recovery chamber according to another embodiment of the present invention.

FIG. 10 is a schematic cross-sectional view showing a piston of the power recovery chamber according to another embodiment of the present invention. In the example shown in FIG. 10, the piston 33 has both side surfaces 33s which are formed into a tapered shape so as to be thinner gradually in a radial direction from an inner circumferential side to an outer circumferential side. Therefore, the amount of material for the piston 33 can be reduced, and thus the weight of the piston can be reduced (lightweight of the piston) and contact pressure P generated at the contact surfaces of the piston bearing 36 and the piston guide 35 can be reduced. Further, the manufacturing cost of the piston can be reduced.

Figure 11:
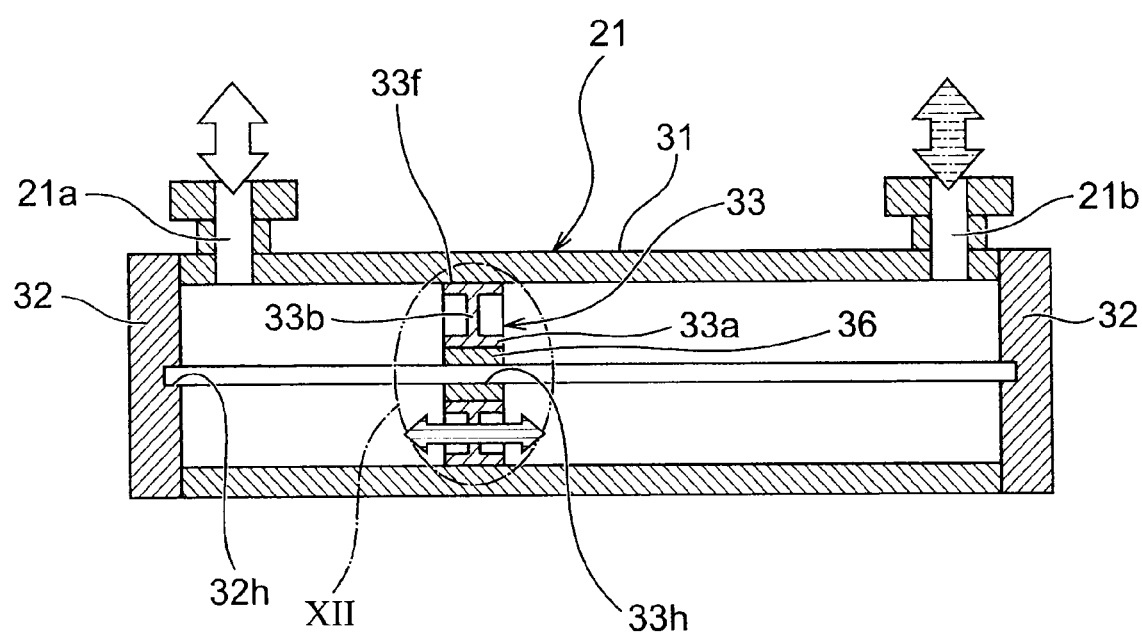
FIG. 11 is a schematic cross-sectional view showing a power recovery chamber according to a third embodiment of the present invention.

FIG. 11 is a schematic cross-sectional view showing a power recovery chamber according to a third embodiment of the present invention. The power recovery chamber according to the third embodiment of the present invention is different from the power recovery chamber according to the second embodiment of the present invention in the configuration of piston. According to the present embodiment, the piston 33 is not in the form of cylinder solid, but in the form of cylinder with annular recesses. Specifically, the piston 33 has a flange part (piston flange) at an outer circumferential portion thereof and two annular recesses at side surfaces thereof, so that the flange part is capable of being deformed toward the inner surface side of the cylinder 31 according to the pressure in the power recovery chamber to reduce a radial clearance between the cylinder 31 and the piston 33. Specifically, in the example shown in FIG. 11, the piston 33 comprises a cylindrical sliding part 33a on which a piston bearing 36 is mounted, a circular plate part 33b having a thin-plate shape extending radially outwardly from the sliding part 33a, and a flange part (piston flange) 33f extending in axially opposite directions from the outer circumferential portion of the circular plate part 33b. According to this structure, the piston 33 becomes thin, and the amount of material to be used for the piston 33 can be reduced. Further, the flange part (piston flange) 33f is deformed toward the inner surface side of the cylinder 31 according to the pressure in the power recovery chamber to reduce the radial clearance between the cylinder 31 and the piston 33.

Figure 12A:
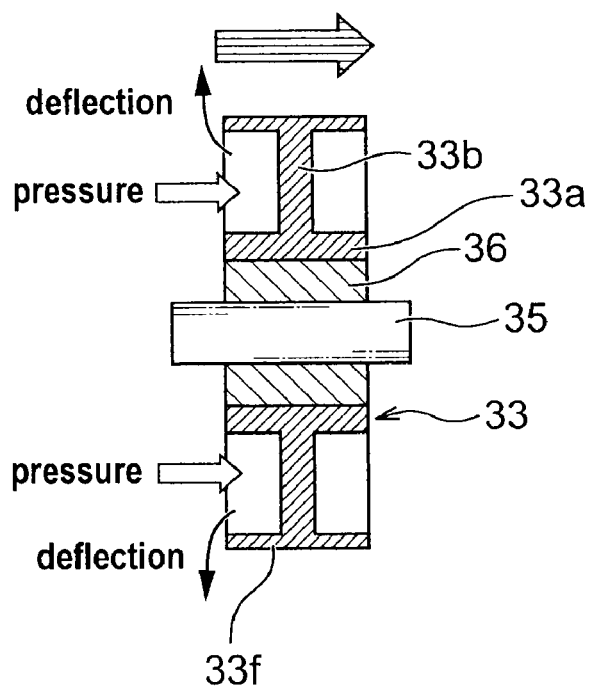
FIGS. 12A and 12B are enlarged views of XII part of FIG. 11, and schematic cross-sectional views showing the relationship between moving direction of a piston and deflection of a flange part (piston flange) of the piston shown in FIG. 11.
Figure 12B:
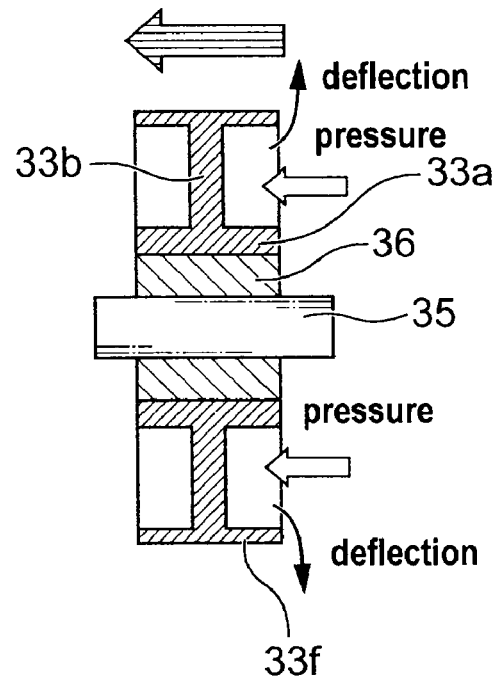

FIGS. 12A and 12B are enlarged views of XII part of FIG. 11, and a schematic cross-sectional view showing the relationship between moving direction of the piston 33 and deflection of the flange part (piston flange) 33f of the piston 33 shown in FIG. 11. In the piston 33 according to the present embodiment, as shown by arrows in FIGS. 12A and 12B, the flange part (piston flange) 33f located at the higher pressure side of the concentrated seawater and the intake seawater which are separated by the piston 33 bends radially outward to reduce a radial clearance between the cylinder 31 and the piston 33. In this manner, since the radial clearance between the cylinder 31 and the piston 33 becomes small, the area of the contact interface between the concentrated seawater and the intake seawater becomes small, and mixing of the concentrated seawater and the intake seawater is suppressed.

As for design condition of the thickness and the length in the thrust direction of the flange part (piston flange) 33f, it is desirable that the amount of deflection of the flange part (piston flange) 33f in a radial direction when pressure is applied to the inner surface of the flange part (piston flange) 33f is equivalent to a radial clearance between the inner surface of the cylinder 31 and the outer surface of the flange part (piston flange) 33f which is kept to the minimum but to the degree to which the flange part (piston flange) 33f is not brought into contact with the inner surface of the cylinder 31.

According to the third embodiment of the present invention, because the radial clearance between the inner surface of the cylinder 31 and the outer surface of the flange part (piston flange) 33f becomes small, the contact interface between the concentrated seawater and the intake seawater becomes small. Therefore, the mixed quantity of the concentrated seawater and the intake seawater is very small, and the above problem (5) can also be suppressed. Thus, the freshwater recovery rate of the reverse osmosis membrane can be prevented from being lowered, the service life of the reverse osmosis membrane cartridge can be prevented from being shortened, and the operational efficiency of the seawater desalination system can be prevented from being lowered.

In the power recovery chamber according to the first through third embodiments of the present invention, the length in the thrust direction and the inner diameter of the cylinder 31, the length in the thrust direction and the outer diameter of the piston 33, and the outer diameter of the piston guide 35 can be set on the basis of parameter including a flow rate of the seawater to be handled by the power recovery chamber.

In the power recovery chamber according to the present invention, if the cylinder 31 is disposed with its central axis horizontally, the piston guide 35 is deflected by deadweight of the piston guide, weight of the piston, and forces acting on the piston guide in a longitudinal direction and a vertical direction. Then, the piston guide 35 is designed so that the amount of deflection of the piston guide in the radial direction is set to such a minimum degree that the outer circumferential portion of the piston is not brought into contact with the inner circumferential surface of the cylinder.

Figure 13:
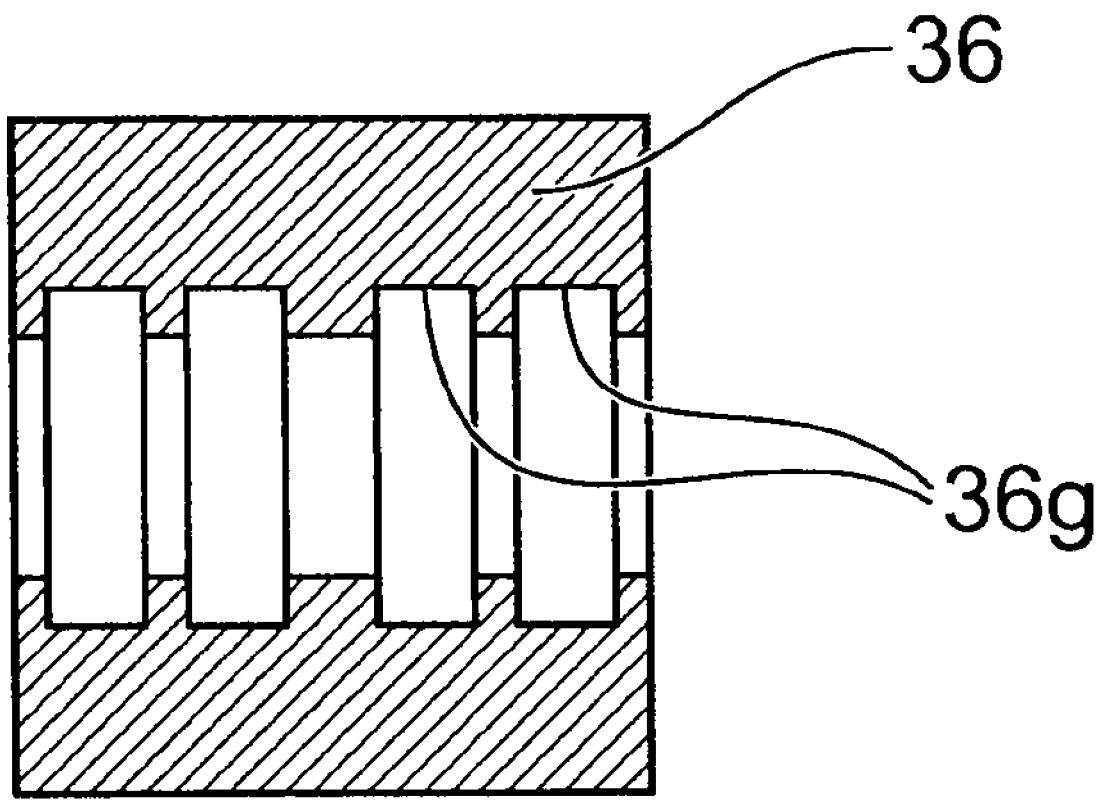
FIG. 13 is a schematic cross-sectional view showing an example of a piston bearing in the power recovery chamber according to the second and third embodiments of the present invention.

FIG. 13 is a schematic cross-sectional view showing an example of the piston bearing in the power recovery chamber according to the second and third embodiments of the present invention. In the example of the piton bearing 36 shown in FIG. 13, plural rows of grooves 36g are formed in the inner surface of the piston bearing 36, i.e. the sliding surface of the piston bearing 36 sliding against the piston guide 35.

In the piston 33 having the piston base 33c shown in FIG. 8B, the above plural rows of grooves may be formed in the sliding surface of the piston bearing 36 sliding against the piston guide 35, the piston bearing 36 being mounted on the position base 33c. Even if the piston or the piston base does not have a piton bearing, plural rows of grooves may be formed in the sliding surface of the piston or the piston base sliding against the piston guide in the same manner as the piston bearing.

The function of the groove 36g is to promote lubrication by providing a liquid reservoir in the sliding surface, to avoid frictional wear of the components, and to reduce friction loss generated in the sliding portion.

Further, the groove 36g has a function for collecting abrasion powder when frictional wear of the component is generated in the sliding portion and preventing the abrasion powder from spreading. Further, since the groove 36g serves also as a labyrinth seal, mixing of the concentrated seawater and the seawater can be suppressed.

The grooves shown in FIG. 13 is illustrated as an example. As long as the groove has the function of a liquid reservoir, the configuration of the groove is not limited to rectangle. The groove may be triangular, circular and the like. The configuration of the groove should be selected and arranged such that processing or machining is easy and machining cost (processing cost) is low.

Figure 14:
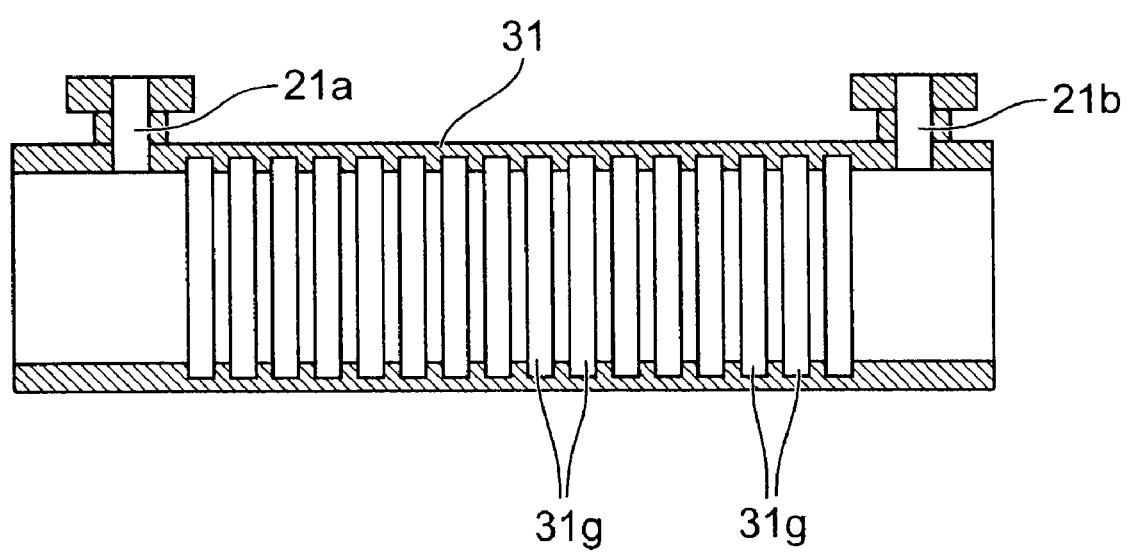
FIG. 14 is a schematic cross-sectional view showing an example of the inner surface of a cylinder in the power recovery chamber according to the first through third embodiments of the present invention.

FIG. 14 is a schematic cross-sectional view showing an example of the inner surface of the cylinder in the power recovery chamber according to the first through third embodiments of the present invention. In the example of the inner surface of the cylinder shown in FIG. 14, plural rows of grooves 31g are formed in the inner surface of the cylinder 31, i.e. the surface of the cylinder 31 facing the piston 33.

The function of the groove 36g is to promote lubrication by providing a liquid reservoir in the surface facing the piston 33, to avoid frictional wear of the components when friction is generated between the inner surface of the cylinder and the outer surface of the piston, and to reduce friction loss generated in the sliding portion.

Further, the groove 31g has a function for collecting abrasion powder when frictional wear of the component is generated in the sliding portion and preventing the abrasion powder from spreading. It is desirable that dimension or pitch of the liquid reservoir (for example, in FIG. 14, dimension of each liquid reservoir having a rectangular cross-section in the longitudinal direction of the cylinder or an interval between the adjacent liquid reservoirs) should be set so that smooth reciprocating motion of the piston 33 is not prevented, even if the outer circumferential portion of the piston 33 is brought into contact with the inner surface of the cylinder 31.

The grooves shown in FIG. 14 are illustrated as an example. As long as the groove has the function of a liquid reservoir, the configuration of the groove is not limited to rectangle. The groove may be triangular, circular and the like. The configuration of the groove should be selected and arranged such that processing or machining is easy and machining cost (processing cost) is low.

Figure 15:
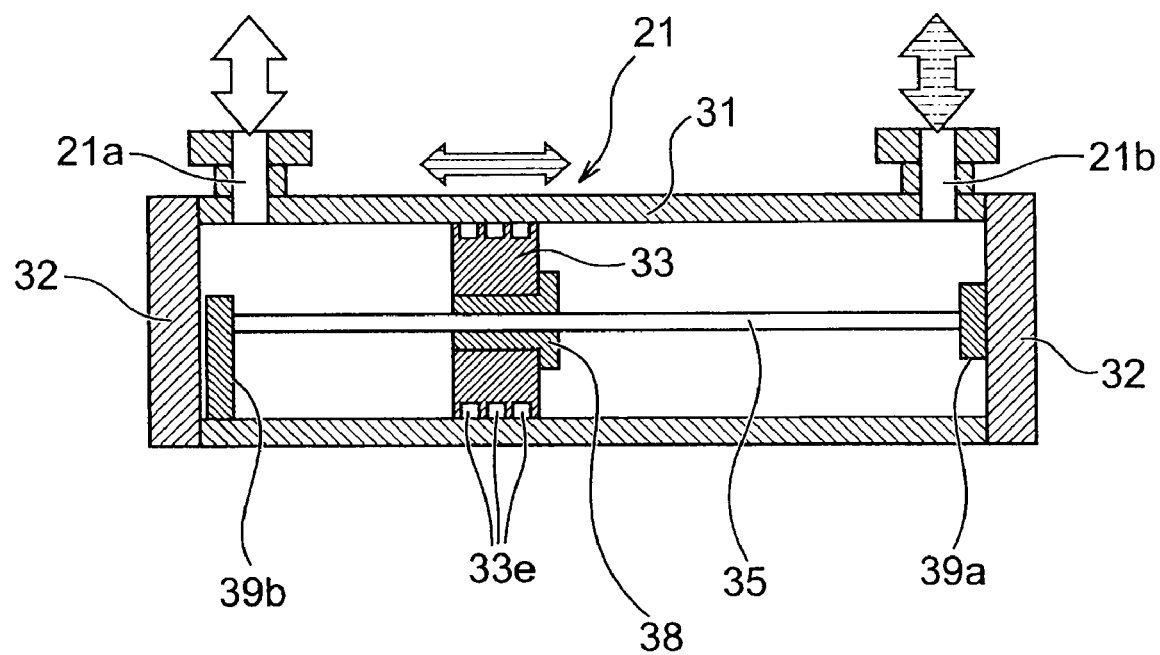
FIG. 15 is a schematic cross-sectional view showing an example of the outer surface of the piston in the power recovery chamber according to the first through third embodiments of the present invention.

FIG. 15 is a schematic cross-sectional view showing an example of the outer surface of the piston in the power recovery chamber according to the first through third embodiments of the present invention. In the example of the outer surface of the piston shown in FIG. 15, plural rows of grooves 33e are formed in the outer surface of the piston 33, i.e. the surface of the piston 33 facing the cylinder 31.

The function of the groove 33e is to promote lubrication by providing a liquid reservoir in the surface facing the cylinder 31, to avoid frictional wear of the components when friction is generated between the inner surface of the cylinder and the outer surface of the piston, and to reduce friction loss generated in the sliding portion.

Further, the groove 33e has a function for collecting abrasion powder when frictional wear of the component is generated in the sliding portion and preventing the abrasion powder from spreading. It is desirable that dimension or pitch of the liquid reservoir (for example, in FIG. 15, dimension of each liquid reservoir having a rectangular cross-section in the longitudinal direction of the piston or an interval between the adjacent liquid reservoirs) should be set so that smooth reciprocating motion of the piston 33 is not prevented, even if the outer circumferential portion of the piston 33 is brought into contact with the inner surface of the cylinder 31.

The grooves shown in FIG. 15 are illustrated as an example. As long as the groove has the function of a liquid reservoir, the configuration of the groove is not limited to rectangle. The groove may be triangular, circular and the like. The configuration of the groove should be selected and arranged such that processing or machining is easy and machining cost (processing cost) is low.

According to the present embodiment, as shown in FIG. 15, a piston base 38 is provided at the inner circumferential side of the piston 33, and the piston 33 is guided by the sliding surfaces of the piston base 38 and the piston guide 35. Further, both ends of the piston guide 35 are supported by a support member 39a fixed to the cylinder cover 32 and a support member 39b fixed to the cylinder 31.

Surface roughness of each of the sliding surfaces of the piston guide 35 and the piston bearing 36 in the power recovery chamber according to the present invention is preferably in the range of 0.8 to 2.5 μm in the maximum height. That is, the surface roughness is set to the maximum height Rmax=0.8 –2.5 μm.

An installation method of the power recovery chamber according to the present invention is not limited to the horizontal installation in which the central axis of the cylinder 31 is located horizontally. The power recovery chamber may be installed vertically depending on its installation requirements. In the case where the power recovery chamber is installed vertically, the central axis of the cylinder 31 is located vertically. In this case, sliding loss between the piston guide 35 and the piston 33 or the piston bearing 36 becomes smaller than the sliding loss in the horizontal installation, because radial load is practically naught or becomes very small.

Figure 16:
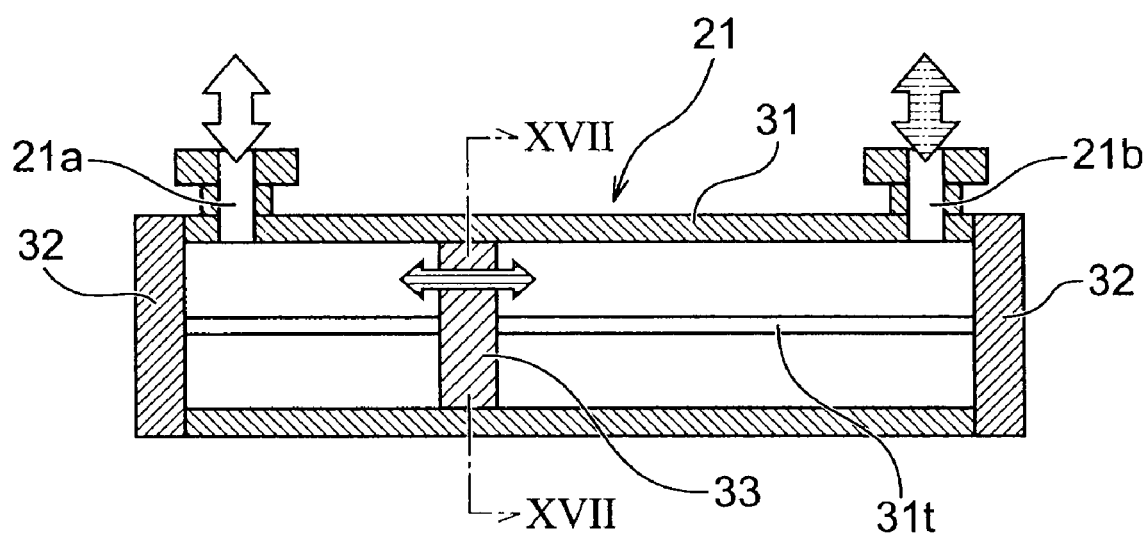
FIG. 16 is a cross-sectional view of a power recovery chamber according to a fourth embodiment of the present invention.
Figure 17:
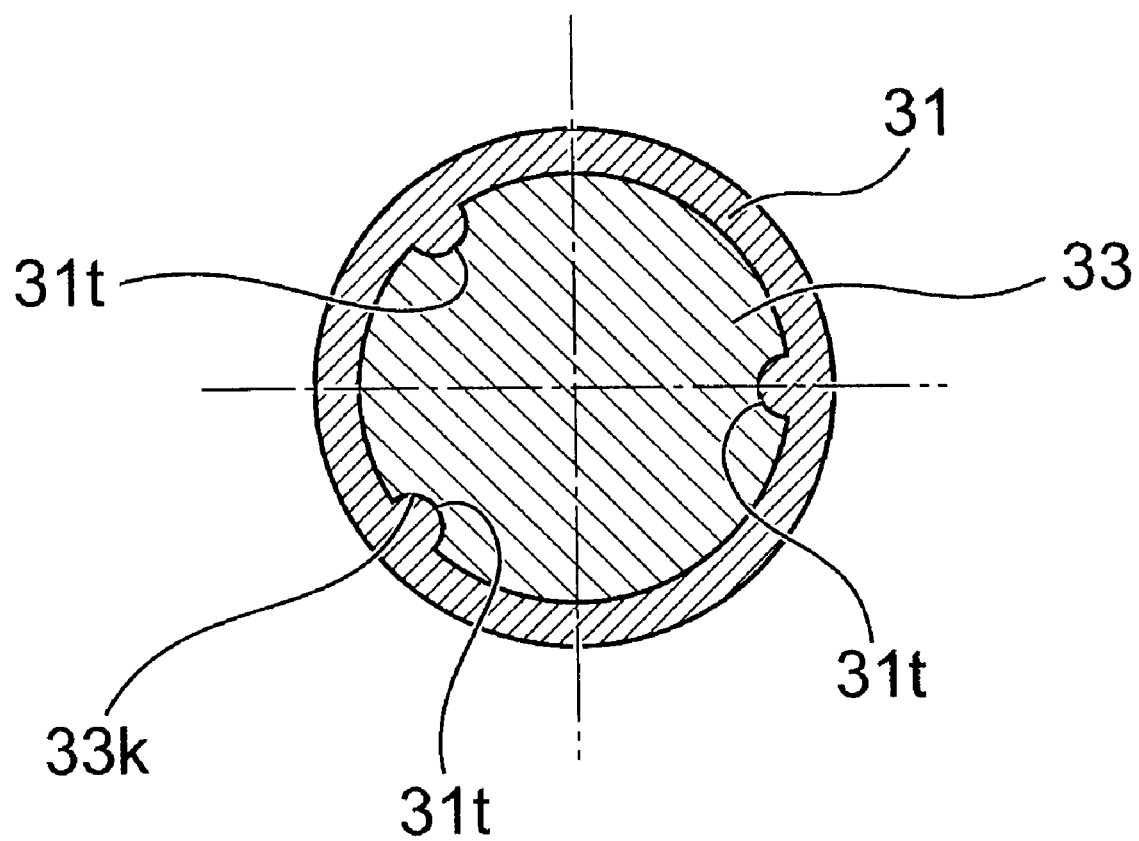
FIG. 17 is a cross-sectional view taken along line XVII-XVII of FIG. 16.
Figure 18:
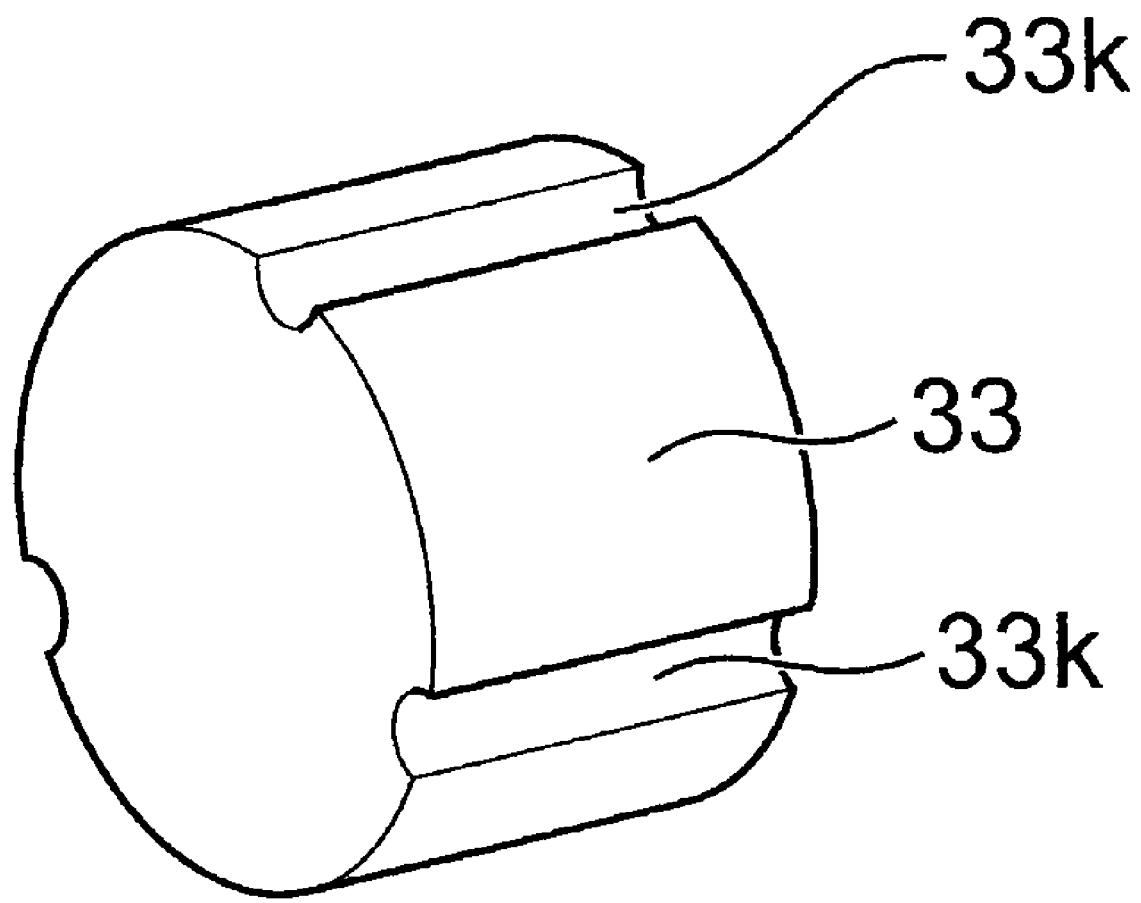
FIG. 18 is a perspective view of a piston of the power recovery chamber.

FIGS. 16 through 18 are views showing a power recovery chamber according to a fourth embodiment of the present invention. FIG. 16 is a cross-sectional view of the power recovery chamber, FIG. 17 is a cross-sectional view taken along line XVII-XVII of FIG. 16, and FIG. 18 is a perspective view of the piston of the power recovery chamber. As shown in FIG. 16, the power recovery chamber 21 according to the present embodiment comprises a cylinder 31 having a cylindrical shape, circular cylinder covers 32, 32 for covering both opening ends of the cylinder 31, and a piston 33 which is reciprocated in the cylinder 31.

As shown in FIGS. 16 and 17, projecting portions 31t extending in a longitudinal direction of the cylinder is formed on the inner circumferential surface of the cylinder 31 at plural locations of the circumferential direction. The longitudinal projecting portions 31t are formed integrally with the cylinder 31. Fitting portions 33k comprising recesses (grooves) to be fitted with the longitudinal projecting portions 31t of the cylinder 31 are formed in the outer circumferential surface of the piston 33 at plural locations of the circumferential direction. The fitting portions 33k are formed in the same direction as the axis of the piston 33, and the number of the fitting portions 33k is the same as the number of the longitudinal projecting portions 31t of the cylinder 31.

The piston 33 is configured to reciprocate freely in the longitudinal direction of the cylinder 31 in such a manner that the fitting portions 33k are brought into contact with the longitudinal projecting portions 31t of the cylinder 31, but the outer circumferential surface of the piston 33 is not brought into contact with the inner surface of the cylinder 31 except for the longitudinal projecting portions 31t. Specifically, according to the present embodiment, the longitudinal projecting portions 31t of the cylinder 31 correspond to the piston guide 35 according to the first through third embodiments of the present invention, and sliding motion between the cylinder 31 and the piston 33 is performed between the longitudinal projecting portions 31t and the fitting portions 33k to guide the piston 33 in a predetermined moving direction. Then, the outer circumferential surface of the piston 33 except for the fitting portions 33k is prevented from being in contact with the inner surface of the cylinder 31, and thus the sliding area can be reduced and the friction loss can be suppressed.

The configuration of the longitudinal projecting portion 31t of the cylinder 31 and the fitting portion 33k of the piston 33 is not limited to semicircle as shown in FIGS. 17 and 18. The configuration of the longitudinal projecting portion 31t of the cylinder 31 and the fitting portion 33k of the piston 33 may be rectangular, triangular and the like, and may be properly selected on the basis of design condition or the like.

Figure 19:
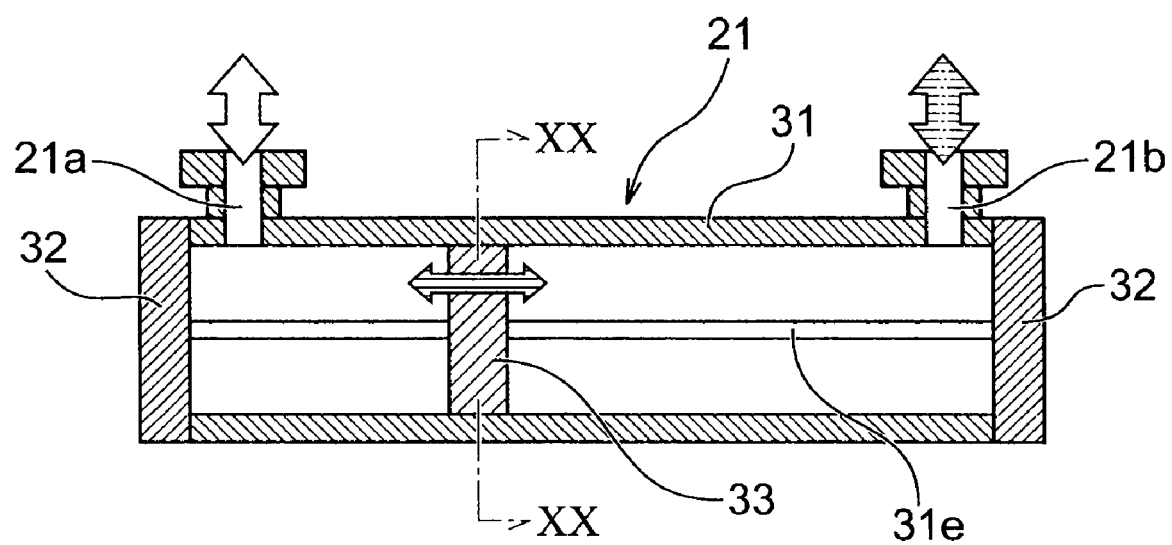
FIG. 19 is a cross-sectional view of a power recovery chamber according to a fifth embodiment of the present invention.
Figure 20:
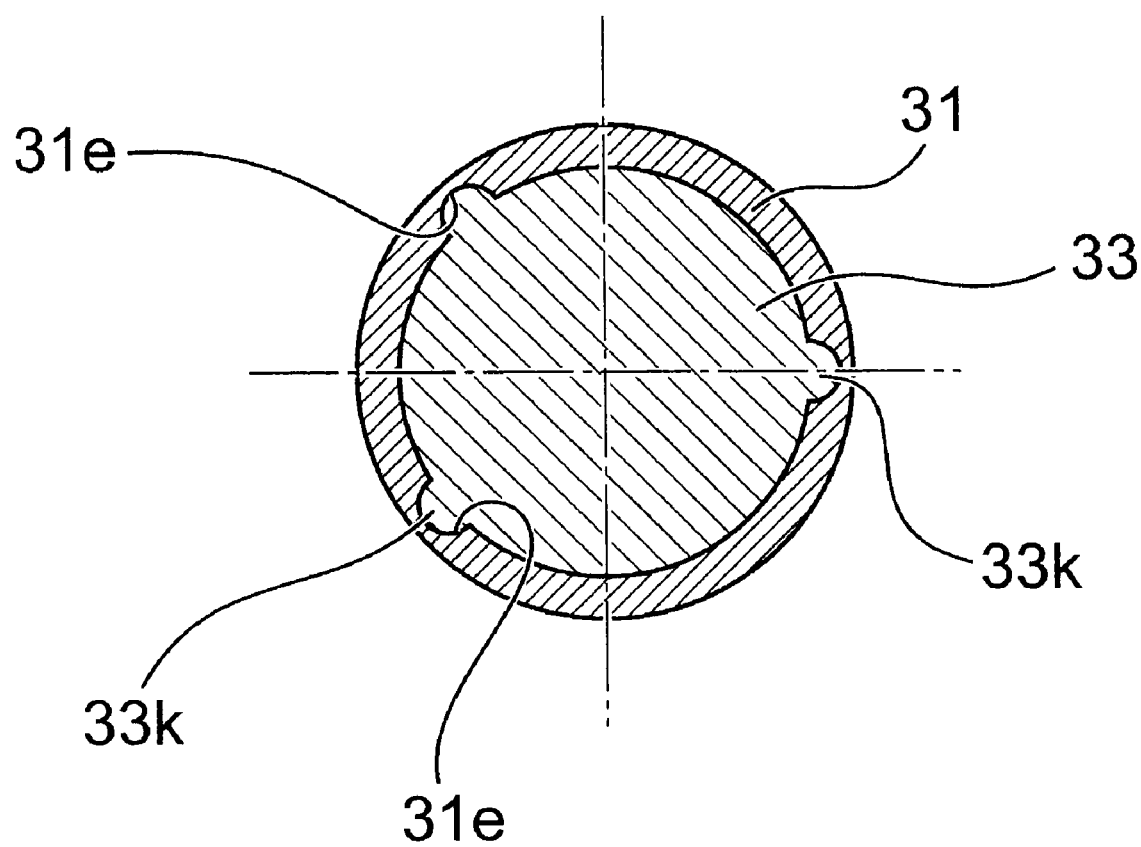
FIG. 20 is a cross-sectional view taken along line XX-XX of FIG. 19.
Figure 21:
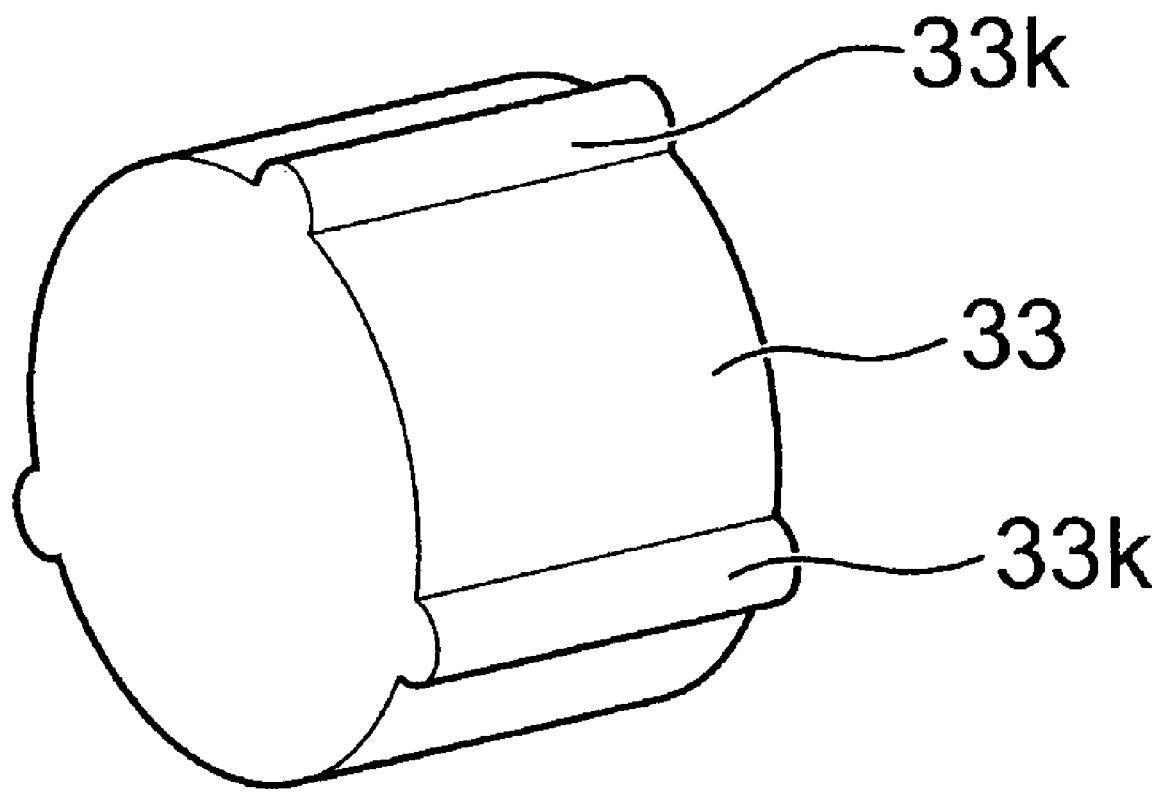
FIG. 21 is a perspective view of a piston of the power recovery chamber.

FIGS. 19 through 21 are views showing a power recovery chamber according to a fifth embodiment of the present invention. FIG. 19 is a cross-sectional view of the power recovery chamber, FIG. 20 is a cross-sectional view taken along line XX-XX of FIG. 19, and FIG. 21 is a perspective view of a piston of the power recovery chamber. As shown in FIG. 19, the power recovery chamber 21 according to the present embodiment comprises a cylinder 31 having a cylindrical shape, circular cylinder covers 32, 32 for covering both opening ends of the cylinder 31, and a piston 33 which is reciprocated in the cylinder 31.

As shown in FIGS. 20 and 21, grooves 31e extending in a longitudinal direction of the cylinder 31 is formed in the inner circumferential surface of the cylinder 31 at plural locations of the circumferential direction. The longitudinal grooves 31e are formed integrally with the cylinder 31. Fitting portions 33k comprising projections to be fitted with the longitudinal grooves 31e of the cylinder 31 are formed on the outer circumferential surface of the piston 33 at plural locations of the circumferential direction. The fitting portions 33k are formed in the same direction as the axis of the piston 33, and the number of the fitting portions 33k is the same as the number of the longitudinal grooves 31e of the cylinder 31.

The piston 33 is configured to reciprocate freely in the longitudinal direction of the cylinder 31 in such a manner that the fitting portions 33k are brought into contact with the longitudinal grooves 31e of the cylinder 31, but the outer circumferential surface of the piston 33 is not brought into contact with the inner surface of the cylinder 31 except for the longitudinal grooves 31e. Specifically, according to the present embodiment, the longitudinal grooves 31e of the cylinder 31 correspond to the piston guide 35 according to the first through third embodiments of the present invention, and sliding motion between the cylinder 31 and the piston 33 is performed between the longitudinal grooves 31e and the fitting portions 33k to guide the piston 33 in a predetermined moving direction. Then, the outer circumferential surface of the piston 33 except for the fitting portions 33k is prevented from being in contact with the inner surface of the cylinder 31, and thus the sliding area can be reduced and the friction loss can be suppressed.

The configuration of the longitudinal grooves 31e of the cylinder 31 and the fitting portions 33k of the piston 33 is not limited to semicircle as shown in FIGS. 20 and 21, but may be rectangular, triangular, and the like. The configuration of the longitudinal grooves 31e of the cylinder 31 and the fitting portions 33k of the piston 33 may be properly selected on the basis of design condition or the like.

Next, materials of the components constituting the power recovery chamber according to the embodiments of the present invention will be described in detail.

The components may be composed of a single material or combination of plural materials. In the case of combination of plural materials, a suitable material may be applied only for the necessary part.

It is necessary for materials of each sliding part in the piston guide 35, and the piston 33 or the piston bearing 36 to accomplish the low frictional wear conditions under lubrication of salt water (seawater or concentrated seawater). The components of the sliding part are made of a metal, ceramics, or a high-polymer material. The metal may be stainless steel or duplex stainless steel. The ceramics may includes at least one of alumina ($Al_2O_3$), silicon nitride ($Si_3N_4$), silicon carbide (SiC), and sialon (SiAlON). The coating may be a sprayed ceramics coating made of oxide ceramics (chromium oxides ($Cr_2O_3$), alumina ($Al_2O_3$) ) or carbide cermets (tungsten carbide-nickel chromium (WC—NiCr), tungsten carbide-cobalt chrome (WC—CoCr), chromium carbide-nickel chromium ($Cr_3C_2$—NiCr)). A layer of nickel (Ni), nickel-chromium (Ni—Cr), nickel-chromium-molybdenum (Ni—Cr—Mo) or the like may be interposed between the ceramics coating and the base material to prevent the seawater from seeping into the base material for thereby preventing crevice corrosion of the base material.

The coating may alternatively be a physical vapor deposition (PVD) or chemical vapor deposition (CVD) ceramics coating made of diamond-like carbon coating (DLC), titanium nitride coating (TiN), titanium carbon nitride coating (TiCN), titanium aluminium nitride coating (TiAlN), chromium nitride coating (CrN), cubic boron nitride coating (cBN), polycrystalline diamond coating (PCD), or silicon carbide coating (SiC).

The high-polymer material may be in the form of a coating or a bulk including at least one of polyamide (PA), polyacetal (POM), polybutylene terephthalate (PBT), polyethylene terephthalate (PET), polyphenylene ether (PPE), polycarbonate (PC), ultra-high molecular weight polyethylene (UHMW-PE), polytetrafluoroethylene (PTFE), polyphenylene sulfide (PPS), polyimide (PI), polyetheretherketone (PEEK), polyarylate (PAR), phosphorus sulfur fluorine (PSF), polyetherimide (PET), polyamide-imide (PAT), polyether sulfone (PES), and polybenzimidazole (PBI). These high-polymer materials may be mixed with carbon fibers, glass fibers, or a solid lubricant.

The preferable materials of the cylinder 31 include a metal, ceramics, and the like. The metal may be stainless steel or duplex stainless steel. The ceramics may includes at least one of alumina ($Al_2O_3$), silicon nitride ($Si_3N_4$), silicon carbide (SiC), and sialon (SiAlON).

The inner surface of the cylinder 31, the outer circumferential surface of the piston guide 35, or both of the inner surface of the cylinder 31 and the outer circumferential surface of the piston guide 35 may be coated with the preferable materials.

The coating may be a sprayed ceramics coating made of oxide ceramics (chromium oxides ($Cr_2O_3$), alumina ($Al_2O_3$) or carbide cermets (tungsten carbide-nickel chromium (WC—NiCr), tungsten carbide-cobalt chrome (WC—CoCr), chromium carbide-nickel chromium ($Cr_3C_2$—NiCr)). The coating may alternatively be a physical vapor deposition (PVD) or chemical vapor deposition (CVD) ceramics coating made of diamond-like carbon coating (DLC), titanium nitride coating (TiN), titanium carbon nitride coating (TiCN), titanium aluminium nitride coating (TiAlN), chromium nitride coating (CrN), cubic boron nitride coating (cBN), polycrystalline diamond coating (PCD), or silicon carbide coating (SiC).

A layer of nickel (Ni), nickel-chromium (Ni—Cr), nickel-chromium-molybdenum (Ni—Cr—Mo) or the like may be interposed between the ceramics coating and the base material to prevent the seawater from seeping into the base material for thereby preventing crevice corrosion of the base material.

Although certain preferred embodiments of the present invention have been shown and described in detail, it should be understood that various changes and modifications may be made therein without departing from the scope of the appended claims.

---

What is claimed is:

1. A power recovery chamber for use in a positive-displacement power recovery apparatus for recovering power at a low-pressure liquid side by boosting pressure of low-pressure liquid by transferring pressure of high-pressure liquid to said low-pressure liquid, said power recovery chamber comprising:
 a cylinder;
 a piston disposed in said cylinder and capable of being reciprocated in a longitudinal direction of said cylinder;
 a piston guide disposed in said cylinder and extending in said longitudinal direction of said cylinder for guiding said piston when said piston is reciprocated in said longitudinal direction of said cylinder;
 cylinder covers for covering both ends of said cylinder, said cylinder and said cylinder covers forming a liquid container; and
 openings formed in said cylinder or said cylinder covers for allowing said high-pressure liquid and said low-pressure liquid to pass therethrough, respectively;
 wherein at least a part of an outer circumferential surface of said piston is out of contact with an inner surface of said cylinder installed to form a radial clearance between said piston and said cylinder, creating a contact interface between said low-pressure liquid and said high-pressure liquid in said radial clearance, and said piston is brought into contact with said piston guide at a part where said piston guide passes through said piston.

2. The power recovery chamber according to claim 1, wherein a thickness of radially outer part of said piston is smaller than a thickness of radially inner part of said piston to reduce mass of said piston.

3. The power recovery chamber according to claim 1, wherein said piston has a flange at both side surfaces facing said cylinder covers, said flange extends from a predetermined position of said piston in a radial direction to an outer circumferential surface of said piston, and said flange is configured to be deformed radially outward by differential pressure between said high-pressure liquid and said low-pressure liquid.

4. The power recovery chamber according to claim 1, wherein said piston comprises a piston base having said part where said piston guide passes through said piston, and a ring part extending radially outward from said piston base.

5. The power recovery chamber according to claim 1, wherein said piston has a sliding member at said part where said piston guide passes through said piston so that said sliding member is brought into sliding contact with said piston guide.

6. The power recovery chamber according to claim 1, wherein said piston guide comprises a single rod having a uniform cross-section in a longitudinal direction of said piston guide, and a central axis of said cylinder and a centroid of a cross-section of said piston guide are aligned with each other.

7. The power recovery chamber according to claim 6, wherein both ends of said piston guide are supported by support members provided on said cylinder cover or said cylinder.

8. The power recovery chamber according to claim 1, wherein said piston guide comprises a plurality of rods each having a uniform cross-section in a longitudinal direction of said piston guide, and each rod is disposed such that a central axis of said cylinder and a centroid of a cross-section of said piston guide are parallel to each other.

9. The power recovery chamber according to claim 8, wherein both ends of each rod are supported by support members provided on said cylinder cover or said cylinder.

10. The power recovery chamber according to claim 1, wherein said piston has a plurality of grooves in a circumferential direction at said part where said piston guide passes through said piston.

11. The power recovery chamber according to claim 1, wherein a plurality of concavo-convex portions extending in a circumferential direction are formed in an outer circumferential surface of said piston along a longitudinal direction of said cylinder to form a labyrinth seal together with an inner surface of said cylinder.

12. The power recovery chamber according to claim 1, wherein a plurality of grooves extending in a circumferential direction are formed in an inner surface of said cylinder along a longitudinal direction of said cylinder.

13. The power recovery chamber according to claim 1, wherein at least one of an outer surface of said piston guide and an inner surface of said part of said piston where said piston guide passes through said piston comprises one of stainless steel, ceramics and a high-polymer material.

14. The power recovery chamber according to claim 1, wherein an inner surface of said cylinder comprises one of stainless steel, ceramics and a high-polymer material.

15. A seawater desalination system comprising:
 a high-pressure pump for pressuring seawater;

a reverse osmosis membrane cartridge for treating high-pressure seawater discharged from said high-pressure pump with a reverse osmosis membrane to produce desalinated water;

a positive-displacement power recovery apparatus for pressuring seawater under the pressure of concentrated seawater which is discharged from said reverse osmosis membrane cartridge without being treated by said reverse osmosis membrane; and a pressurizing apparatus for boosting the pressurized seawater discharged from said positive-displacement power recovery apparatus and adding the boosted seawater to the high-pressure seawater discharged from said high-pressure pump;

wherein said positive-displacement power recovery apparatus comprises said power recovery chamber according to claim 1.

16. The power recovery chamber according to claim 1, wherein an entire surface of said outer circumferential surface of said piston is out of contact with the inner surface of said cylinder.

17. A power recovery chamber for use in a positive-displacement power recovery apparatus for recovering power at a low-pressure liquid side by boosting pressure of low-pressure liquid by transferring pressure of high-pressure liquid to said low-pressure liquid, said power recovery chamber comprising:

a cylinder having at least one projecting part in a longitudinal direction or at least one groove extending in a longitudinal direction;

a piston disposed in said cylinder and capable of being reciprocated in a longitudinal direction of said cylinder, said piston having at least one fitting part which is fitted with said at least one projecting part or said at least one groove of said cylinder, said piston being configured to be guided by said projecting part or said groove when said piston is reciprocated;

cylinder covers for covering both ends of said cylinder, said cylinder and said cylinder covers forming a liquid container; and openings formed in said cylinder or said cylinder covers for allowing said high-pressure liquid and said low-pressure liquid to pass therethrough, respectively;

wherein at least a part of an outer circumferential surface of said piston is out of contact with an inner surface of said cylinder installed to form a radial clearance between said piston and said cylinder, creating a contact interface between low-pressure liquid and said high-pressure liquid in said radial clearance, and said piston is brought into contact with said projecting part or said groove of said cylinder.

18. The power recovery chamber according to claim 17, wherein at least one of a surface of said projecting part or said groove of said cylinder and a surface of said fitting part of said piston comprises one of stainless steel, ceramics and a high-polymer material.

19. The power recovery chamber according to claim 17, wherein an inner surface of said cylinder comprises one of stainless steel, ceramics and a high-polymer material.

20. A seawater desalination system comprising:

a high-pressure pump for pressuring seawater;

a reverse osmosis membrane cartridge for treating high-pressure seawater discharged from said high-pressure pump with a reverse osmosis membrane to produce desalinated water;

a positive-displacement power recovery apparatus for pressuring seawater under the pressure of concentrated seawater which is discharged from said reverse osmosis membrane cartridge without being treated by said reverse osmosis membrane; and a pressurizing apparatus for boosting the pressurized seawater discharged from said positive-displacement power recovery apparatus and adding the boosted seawater to the high-pressure seawater discharged from said high-pressure pump;

wherein said positive-displacement power recovery apparatus comprises said power recovery chamber according to claim 17.

\* \* \* \* \*

SEQUENCE LISTING

```
<160> NUMBER OF SEQ ID NOS: 4

<210> SEQ ID NO 1
<211> LENGTH: 5
<212> TYPE: PRT
<213> ORGANISM: Unknown
<220> FEATURE:
<223> OTHER INFORMATION: Description of Unknown: Tachykinin mammalian
      peptide
<220> FEATURE:
<221> NAME/KEY: MOD_RES
<222> LOCATION: (2)..(2)
<223> OTHER INFORMATION: Any amino acid

<400> SEQUENCE: 1

Phe Xaa Gly Leu Met
1               5

<210> SEQ ID NO 2
<211> LENGTH: 11
<212> TYPE: PRT
<213> ORGANISM: Unknown
<220> FEATURE:
<223> OTHER INFORMATION: Description of Unknown: Substance P tachykinin
      mammalian peptide

<400> SEQUENCE: 2

Arg Pro Lys Pro Gln Gln Phe Phe Gly Leu Met
1               5                   10

<210> SEQ ID NO 3
<211> LENGTH: 10
<212> TYPE: PRT
<213> ORGANISM: Unknown
<220> FEATURE:
```

-continued

```
<223> OTHER INFORMATION: Description of Unknown: Neurokinin A tachykinin
      mammalian peptide

<400> SEQUENCE: 3

His Lys Thr Asp Ser Phe Val Gly Leu Met
1               5                   10

<210> SEQ ID NO 4
<211> LENGTH: 10
<212> TYPE: PRT
<213> ORGANISM: Unknown
<220> FEATURE:
<223> OTHER INFORMATION: Description of Unknown: Neurokinin B tachykinin
      mammalian peptide

<400> SEQUENCE: 4

Asp Met His Asp Phe Phe Val Gly Leu Met
1               5                   10
```